(12) United States Patent
Williame et al.

(10) Patent No.: US 7,027,650 B2
(45) Date of Patent: Apr. 11, 2006

(54) DYNAMIC COMPUTING IMAGERY, ESPECIALLY FOR VISCERAL OSTEOPATHY AND FOR ARTICULAR KINETICS

(76) Inventors: Christian Williame, Rue Jaures 38, B7390 Quaregnon (BE); Georges Finet, Rue Desiree 413, B7390 Quaregnon (BE)

( * ) Notice: Subject to any disclaimer, the term of this patent is extended or adjusted under 35 U.S.C. 154(b) by 785 days.

(21) Appl. No.: 10/167,640

(22) Filed: Jun. 10, 2002

(65) Prior Publication Data

US 2003/0081837 A1 May 1, 2003

Related U.S. Application Data

(63) Continuation-in-part of application No. PCT/BE00/00145, filed on Dec. 8, 2000.

(60) Provisional application No. 60/170,222, filed on Dec. 10, 1999.

(51) Int. Cl.
G06K 9/62 (2006.01)

(52) U.S. Cl. .............. 382/215; 382/128; 382/190
(58) Field of Classification Search ............. 382/103, 382/128–132, 169.1, 90, 195, 199, 201, 203, 382/209, 215, 218, 242, 278, 293; 348/26, 348/169; 128/922
See application file for complete search history.

(56) References Cited

U.S. PATENT DOCUMENTS

| | | | | |
|---|---|---|---|---|
| 5,446,836 A | | 8/1995 | Lentz et al. ............. | 345/441 |
| 5,559,901 A | * | 9/1996 | Lobregt ................. | 382/256 |
| 5,926,568 A | * | 7/1999 | Chaney et al. .......... | 382/217 |
| 6,256,411 B1 | * | 7/2001 | Iida ..................... | 382/203 |
| 6,385,332 B1 | * | 5/2002 | Zahalka et al. .......... | 382/128 |
| 6,594,378 B1 | * | 7/2003 | Li et al. ................ | 382/128 |
| 6,778,690 B1 | * | 8/2004 | Ladak et al. ........... | 382/131 |
| 6,912,310 B1 | * | 6/2005 | Park et al. ............. | 382/199 |

OTHER PUBLICATIONS

Lobregt, et al. "A discrete dynamic contour model", IEEE, pp. 12-24, 1995.*
Liu, et al. "Optimal contour approximation by deformable piecewise cubic splines", IEEE, pp. 638-643, 1991.*
Geiger, et al. "Dynamic programming for detecting, tracking, and matching deformable contours", IEEE, pp. 294-302, 1995.*

(Continued)

Primary Examiner—Daniel Miriam
(74) Attorney, Agent, or Firm—Hovey Williams LLP

(57) ABSTRACT

Computerized method for studying alterations in the location of an object, said method comprising the steps of computing successive shapes by means of a dynamic contour model algorithm, whereby the dynamic contour model algorithm develops successive shapes and determines a correlation between two successive shapes and for stopping the reiteration of the algorithm when said determined correlation is lower than a predetermined value.

30 Claims, 15 Drawing Sheets

OTHER PUBLICATIONS

Article entitled "A Method for Incorporating Organ Motion Due to Breathing into 3D Dose Calculations" published May 1999 at pp. 715-720 of Med. Pys. 26(5).

Article entitled "Analysis of in vivo 3-D Internal Kinematics of the Joints of the Foot" published Nov. 1998 at pp. 1387-1396 of IEEE Transactions on Biomedical Engineering, vol. 45, No. 11.

Article entitled "Snakes: Active Contour Models" published Aug. 10, 1987 by the IEEE at pp. 259-268.

Article entitled "Model-Based Analysis of Cardiac-Motion from Tagged MRI Data" published Jun. 11, 1994 by the IEEE in the Seventh Annual IEEE Symposium on Computer-Based Medical Systems, pp. 40-45.

Article entitled "Analysis and Characterization of the Left Ventricular Wall Motion by Means of 3D-Models" published in Computers in Cardiology on Oct. 15, 1987, pp. 643-646.

* cited by examiner

DYNAMIC COMPUTING IMAGERY, ESPECIALLY FOR VISCERAL OSTEOPATHY AND FOR ARTICULAR KINETICS

This application is a continuation-in-part of co-pending International Application No. PCT/BE00/00145, with an international filing date of Dec. 8, 2000, published in English under PCT Article 21(2) on Jun. 14, 2001 which claims the benefit of U.S. Provisional Application No. 60/170,222 filed Dec. 10, 1999.

FIELD OF THE INVENTION

The present invention is related to a computing imagery method for studying alterations in the location of an object after a movement thereof. In said method, the position of the object in two images is analyzed. This method is particularly suitable for evaluating or controlling visceral movement or articular kinetics based on medical imaging techniques. The invention is equally related to a computer program for performing said method.

THE PRIOR ART

It has already been proposed to analyze two images of an object so as to determine the movement of said object between its position in the first image and its position in its second image.

Such a method is currently made by a view analyzing by a specialist. For example, when using transparent supports for the images, the supports can be superimposed. Osteopaths sustain that the visceral dynamics can be origin of certain lesion if the visceral movement is not normally accomplished.

Before 1985, neither scientific study nor global viscera/ every internal organs) displacement statistic in the abdomen under the influence of diaphragm pressure is available.

An estimate of this movement based on anatomy and physiology argument has been proposed, and some observations were made without statistical study.

The inventors started in 1985 to study, with X-ray and echograms, the movement in abdomen, stomach, small and large intestines, hepar, lien, reni and pancreas that are induced by diaphragma respiratory movement ; note that this visceral movement does not correspond to peristaltism. They defined an optimal study of the organs on an image, established a strict protocol and methodology and took all the necessary and sufficient precautions that are required to achieve a trustworthy scientific work. After analysing around 3000 images by a filly manual procedure, results of which is partly published in reference [1], it appears that this manual approach is in any case too much time consuming for application daily life. Automatic method is required. When having to determine the movement of a viscera or vertebra or articulation, the position of the viscera, vertebra or articulation has first to be determined by the specialist. The exact position or shape given for a same viscera or vertebra on an image depends on the doctor, his skill, etc., whereby the analysis of the images by a doctor is always subjective, i.e. for one doctor the maximum possible movement of the viscera/vertebra is acceptable, while for another doctor the maximum possible movement could be estimated as being deficient, for example partly deficient.

In order to solve this problem, the invention proposes a computerized analysis of the images.

Various documents have already proposed computerized analysis of images.

The article "Analysis of in vivo 3-D internal kinematics of the joints of the foot" Udapa et al, IEEE Transactions on biomedical engineering, vol 45, 11, November 1998 discloses a method in several images are compared so as to enable a motion analysis. In said method the user needs to pick a point of the boundary on a display, and to move the cursor along the boundary so as to define several points which are then connected there between so as to define a boundary considered as being optimal by Udapa et al. The correct picking of points on the boundary is a difficult task and error of picking is unevitable. Such a step requires time and accurateness from the user.

When using such a method for analysing the movement of bones, the results of the analysis are subjective (dependent from the doctor making the analysis) and its accurateness is low.

The article "A method for incorporating organ motion due to breathing into 3D dose calculations", Lujan et al, Med. Phys. 26 (5), May 1999 disclose an analysis method of an organ for determining the amplitude and the frequence of the motion thereof. In said method the probability of the organ to be at a position is determined. This document does not refer to specific steps for the computerized definition of the contour of the object on an image, as required in the method of the invention.

U.S. Pat. No. 5,446,836 (Derek et al) relates to a computer-based method for the rasterization of polygons. No reference is made to a method for studying alterations in the location of an object as disclosed in the invention.

Aim of the Invention

The main difficulty in the treatment of a vision application is the lack of general theory or universal method offering the answer to several problems at the same time. For example, in order to examine the surface quality of continuous plane, products on a high-speed production line cannot be used for recognition of characters or for medical diagnosis. Thus, every particular application requires a proper survey.

It is obvious that the relative volume of information for an application can considerably vary depending on its nature. The treatment will be also quite different according to the requirements of the application (speed, precision . . . ). In one application of the invention, the form of the viscera in normal exhalation and inhalation need to be recognised. It will allow to reduce the visceral dynamic in comparison with the forms. Many applications in the field of medical imagery use the concept of contour. Intuitively, a contour can be defined as the ensemble of points that is the place of a sharp transition of a specific feature (luminance, texture, . . . ) in a given direction. Object contour definition can be accomplished by several ways:

Completely manual: a user draws the contour using some pointing device like a mouse or a graphic tablet. This requires a certain knowledge from the operator about the clinical problem and is expected to consume much time for a significant result. This method is not desirable in the processing of large data set and its reproducibility is reduced.

Completely automatic: the available techniques presented for automatic contouring are not yet enough sophisticated for many typical applications. These methods are reserved for the simplest cases of contour detection.

Automatic followed by manual: the first step (automatic) is usually based on simple techniques of contour detection (threshold or region growing) and the second step (manual) modifies the generated contour on the basis of anatomical and pathological knowledge. This approach is very time consuming and the results are not reproducible.

Manual with further Automatic: the manual intervention just serves to establish an initial contour which will define the initial conditions for the automatic phase the latter procedure will refine the first contour. In this case, the influence of the users is not direct since different starting contours, determined by several users, will lead to the same final result. This method leads to a high degree of reproducibility.

In the preferred method of the invention, the method is substantially fully automatic, as only a starting point belonging to the object (and advantageously not to the contour of the object) is sufficient for the further treatment, or fully automatic, as the starting point belonging to the object (and advantageously not to its contour) can be automatically be selected or marked. The method of the invention uses advantageously a dynamic contour model algorithm and/or a replenishment algorithm, and preferably both algorithms (for example for making comparison of the results obtained by the two methods).

The aim is to propose a method and computer program to allow an automatic and repeatable definition of the contour of an object, essentially of an organ, an articulation, a viscera, one or more vertebras, and an automatic calculation of the alteration in the condition of said object, between two or more different images of said object, especially between two images, preferably corresponding to extreme position of the object, organs, etc. As the method is automatic and repeatable, the method will furnish the same analysis to the doctor, whereby enabling that different doctors could take the same decision or conclusion about a possible deficiency of movement. In view of its repeatability, the method of the invention is suitable for making accurate analysis of losses of movement ability in function of the time, for example after 6 months, after a few years.

In view of its automatic character the method of the invention is also suitable for giving conclusions about a possible loss of articulation movement, for example after a movement, conclusions which could be difficult to be contested. This method is thus interesting for insurance companies, as the possible loss of movement of articulation could be accessed in a way not dependent from one or another expert.

This is also of interest for the patient's health, as up to now the possible lack of movement was not taken into consideration due to the lack of repeatable scientific method.

BRIEF DESCRIPTIONS OF THE INVENTION

The method of the invention is a computerized method requiring no or only limited human acts or manipulations.

The computerized method of the invention is therefore substantially fully automatic.

Characteristics and details of embodiments of the method of the invention are given in the attached claims.

The invention relates to a computerized method for studying alterations in the location of an object from a first image of the object at a first location and a second image of the object at a second location, said images being in the form of series of lines of successive points, said method comprising the steps of:
   viewing at least said first image and said second image of the object on a screen;
   marking at least one element belonging to the object in said first image and in said second image viewed on the screen;
   computing for said first image and said second image, from said marked elements successive shapes by means of a dynamic contour model algorithm, in which the algorithm determines internal forces and external forces at different points of a shape, as well as deformation forces at different points of the shape so as to define a deformed shape, and in which said algorithm is reiterated with said deformed shape up to reaching a stabilized deformed shape, whereby the dynamic contour model algorithm develops successive shapes and is associated to computer instructions for determining a correlation between two successive shapes and for stopping the reiteration of the algorithm when said determined correlation is lower than a predetermined value and
   computing from the deformed shapes of the object in said first and second images an amplitude of the alteration in location of said object between said first and second images.

The invention relates also to a computer program comprising program code means for performing for performing at least the steps of:
   computing from a marked element belonging to a object in a first image and from a marked element belonging to the object in a second image, successive shapes of the object in said first image and in said second image, whereby said computing is performed by using a dynamic contour model algorithm, in which said algorithm determines internal forces and external forces at different points of a shape, as well as deformation forces at different points of the shape so as to define a deformed shape, and in which said algorithm is reiterated with said deformed shape up to reaching a stabilized deformed shape, whereby the dynamic contour model algorithm develops successive shapes and is associated to program codes for determining a correlation between two successive shapes and for stopping the reiteration of the algorithm when said determined correlation is lower than a predetermined value; and
   computing from the deformed shapes of the object in said first and second images an amplitude of the alteration in location of said object between said first and second images.

The invention further relates to a support readable by a computer means comprising program code means for performing at least the steps of the computer program disclosed here above.

A preferred object of the invention is a method comprising the following steps:

Capturing at Least a First Image of Said Object a First Location and a Second Image of Said Object at a Second Location in the Form of Series of Lines of Successive Points.

Said images are captured in a computerized form or in an electronic form or in a numeric form so as to enable the further treatment thereof in the computer. Said images are for example images taken directly from a medical imagery machine, such as a radiographic examination machine, an echographic examination machine, etc. For capturing the images in such a form, a scanner could be used so as to convert an image from a support, such as a paper support, into a computerized readable form or an electronic form. The images provided by the medical imagery machine can also be put in a computer readable form, such as a disc, a memory, etc, so as to enable to the further treatment of the images. The capturing means can even be a modem, when the computer readable image are transmitted to a computer by internet or any other communication/telecommunication systems.

Each point or pixel of the images is defined by a level of grey. The image is advantageously described as a matrix or some other discrete data structure.

The images are for example in a BMP format, but may also be in order format, such as DICOM. When using a DICOM format or images directly furnished by the medical imagery machine, it is not necessary to improve the quality of the images, as said images have already a sufficient quality.

Improving the Quality of Said Images by Using at Least One Image Enhancing Technique When the original image is scanned, the "real grey level" information or at least a portion thereof is lost, i.e. the contrast between the different components constituting the image is lost. In order to extract the object (viscera, articulation, etc. ), it is preferred to enhance first the contrast. of the image. For example, overexposed, underexposed and/or blurred images can be improved with contrast enhancement techniques, known per se.

The grey level histogram can be used for image enhancement, since it has provided several information on the overall brightness and contrast of an image and is a valuable tool for image processing at both the qualitative and quantitative levels.

Histogram equalisation can also be used to produce a coarser quantification of an image. We can smooth the noise (reduce various spurious effects of a local nature in the image) or remove it.

Marking or Selecting at Least One Element (Such as a Group of Points, but Preferably a Single Point) Belonging to the Object on the Image The starting point of this method and-computer software is one or several images in levels of grey (BMP format) containing the object, such as the viscera in inhalation and exhalation positions. These images have been for example scanned. These images are taken on a film or are directly captured from X-rays or echograms systems. The starting point P0 in the drawings corresponds for example to the "click" of the device done by an user or to a point marked electronically or numerically by an user, for example by marking a point directly on the electronic/tactile screen. This point can for example be marked on the image before its scanning. The starting point corresponds to a point belonging to the object, such as viscera, articulation, etc. The starting point is preferably not a point belonging to the contour of the object. As shown by tests, a difference of starting points belonging to the object will not affect the nature of the final edge and the results of the method.

Definite the Contour of Said Object on Said First Image and on Said Second Image Two methods are possible, namely the replenishment method and the dynamic contour model.

The replenishment method is briefly disclosed here after:

Starting form the click point or starting point, points that have the same ordinates are browsed and the colour of every pixel is changed until the edge of the organ is reached.

After having determined and coloured this segment, the following segments are treated one by one until the whole organ is replenished.

The replenishment algorithm ensures for example the coloration of successive parallel linear segments belonging to the organ or object to be analyzed.

In order to avoid error of determination of an end point of one or more segments, an algorithm cooperates with the replenishment algorithm, so as to stop the replenishment or coloration of a segment when the end of a segment or an edge point of the contour can not be recognized by the replenishment algorithm.

This method is advantageously further provided with a smoothing treatment of the contour determined by the replenishment algorithm.

The method of the invention uses advantageously a dynamic contour model algorithm, as briefly disclosed here after.

Dynamic Contour Model Algorithm

Different algorithms can be used, such as the Terzopoulos algorithm or the Miller algorithm.

Terzopoulos [4] who introduced the model of the "Snakes", constructs a contour with connected spline segments and optimizes the contour approximate to a desired form by minimizing an energy function containing internal and external energy. The internal energy corresponds to the energy of curvature of the spline, while the external energy is calculated by integrating image features. Additional constraints are also introduced to obtain a better final contour.

Miller [5] proposes the Geometrically Deformed Model or "GDM". In this method, a contour is described as a set of vertices connected by edges. The energy function is quite different from that used in the Snake model. The energy term depends on an estimation of local curvature and the distance between a vertex and its neighbours. This energy function is evaluated only for the vertex positions and not for the trajectory of the connecting edge segments.

Preferably, in the method of the invention, the dynamic contour model algorithm will use the basic structure of the Miller's model, i.e., vertices connected by edges. In the preferred dynamic model algorithm, the dynamic process will be described in term of force, as being more adequate than the energy of contribution [6] (potential energy). In said preferred method, the method starts from an initial shape, created advantageously with a minimum of user interaction. The dynamic contour model modifies the initial shape to evolve towards the desired contour. The driving force leading to the shape deformation is calculated from internal forces, derived from the shape of the contour model itself, and from an external force field derived from one or more main characteristics (such of the pixel or voxel grey value) of the image. The internal force will try to minimize local contour curvature, while the external forces will try to make the model follow a valley or a ridge through the landscape. An image feature or main characteristic of the image may be simple, like the pixel or voxel grey value, or the magnitude of the grey value gradient, but might also be quite complex, like features or characteristics derived by means of differential geometry. The dynamic contour model is for example a deformation process organized in a number of discrete steps ; after each of them, the situation is analyzed with respect to position, velocity, and acceleration for each of the vertices. In this evaluation, internal and external forces on a vertex are calculated from the position of the vertex and its neighbours. These forces result in an acceleration, which changes the velocity of the vertex. This velocity determines the displacement of the vertex during the next deformation step. After a given number of deformation steps, a final stable situation will be reached and will be characterized by an equilibrium such that the velocity and the acceleration are nulls for each vertex. When described in term of energies, this situation represents a local minimum in the energy function.

During the deformation process, two undesirable effects may occur: shrinking and clustering. The first one is due to the internal forces while the second originates from the external forces. These two perturbation effects will be eliminated by an improvement of the basic technique disclosed in the example.

In comparison to other models, the preferred dynamic contour model method guarantees the connectivity of the contour.

Stopping Algorithm(s) Associated to the Dynamic Contour Model Algorithm

Such an algorithm is suitable for avoiding deformation or further deformation of the shape when a certain correlation between two successive shapes is determined and/or when the shape would be deformed outside of acceptable limits.

As preferred examples of stopping algorithm, the following can be mentioned:

The stopping algorithm stops the action of the attraction forces at a point of the shape for which the external force attracts a portion of the edge outside the outer border of the object. The outer border is advantageously defined by the user or by any other methods, for example by using the replenishment algorithm, for example by linking vertices of the shape defined by the replenishment algorithm (i.e. not taking into account a valley extending between two adjacent vertices).

The stopping algorithm stops the attraction forces at least at a point when the correlation between two successive developed shapes is high.

Both algorithms can be used for controlling the working of the dynamic contour model algorithm. However, the use of at least the stopping algorithm based on the correlation factor between two successive shapes is preferred.

Calculating an Amplitude of the Alteration in Location of an Object.

After determining by the method disclosed here above the shape and position of the object in the first image and in the second image, it is possible to calculate the amplitude of movement between for example two extreme positions, for example between a position of an organ during the inhalation (for example at the end of the inhalation) and a position of the organ during the exhalation (for example at the end of the exhalation); between two extreme positions of articulation, of vertebra, of spine, etc.

PREFERRED EMBODIMENT

The method of the invention is operated by a computer or by computers connected there between directly (internet, extranet, intranet, local provider, communication means, etc.) or indirectly (by means of electronic support means, disc, Cdrom, etc.). Preferably, the computerized method is carried out on a local computing system, such as on a personal computer, laptop, etc.

A preferred method will now be described for analysing the alterations in the location of a viscera in the inhalation position (image 1) and in the exhalation position (image 2).

Figure 1:
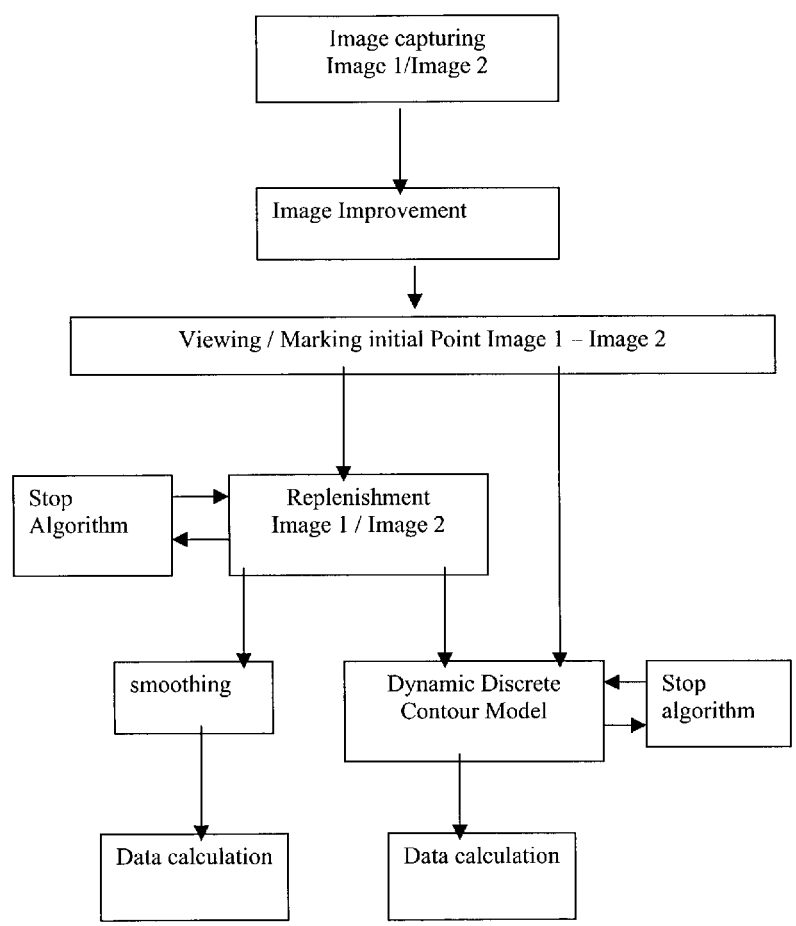
FIG. 1 is a general diagram showing the working of a preferred method of the invention.

The computer is operating the method as follows, as shown schematically in FIG. 1:

Image Capturing

Two images of the viscera in extreme positions are converted in numerical forms, so as to enable the further processing thereof.

In the present case, the image capturing system used was a scanner suitable for converting paper image 1 and paper image 2 into a numerical forms readable by the computer for the further treatment thereof.

The images in numerical forms have the form of a matrix, each element of the matrix defining a grey level of the pixels of the image.

Each line of the matrix corresponds to a line of pixels of the image.

When capturing the images, the format thereof is determined (for example BMP, DICON). In case, the images are in BMP format, the quality of images will be improved by the following step.

Improvement of the Images

Due to the scanning of the images, at least part of the real grey level is lost, i.e. at least part of the contrast between different pixels constituting the image.

The contrast of the images or portions thereof (such as overexposed, underexposed, blurred) can be increased by known contrast enhancement techniques.

The grey level histogram can also be used for image enhancement, since it contains several information on the overall brightness and contrast of an image and is therefore a valuable tool for image processing at both qualitative and quantitative levels.

Histogram equalisation can also be used to produce a coarser quantification of an image. The noise can be smoothed or removed (reduction or removal of various spurious effects of a local nature in the image).

It is obvious that in case the images are of high quality (such as Dicon format) or are directly provided in numerical form from the imagery machine, the method can not be provided with said image enhancing step.

Viewing of the Images

The two improved images are then viewed on a screen, such as on a computer screen.

A point P0 belonging to the viscera is marked on each image viewed on the screen. The marking of said point is made by moving the cursor of the mouse at the selected location and by clicking at said location.

The images can be viewed simultaneously or successively. Preferably, the images are viewed simultaneously.

Replenishment

While in embodiments, this step is not absolutely required, the use of replenishment algorithms could be of interest, for enabling comparison of results obtained by two distinct methods.

Figure 2:
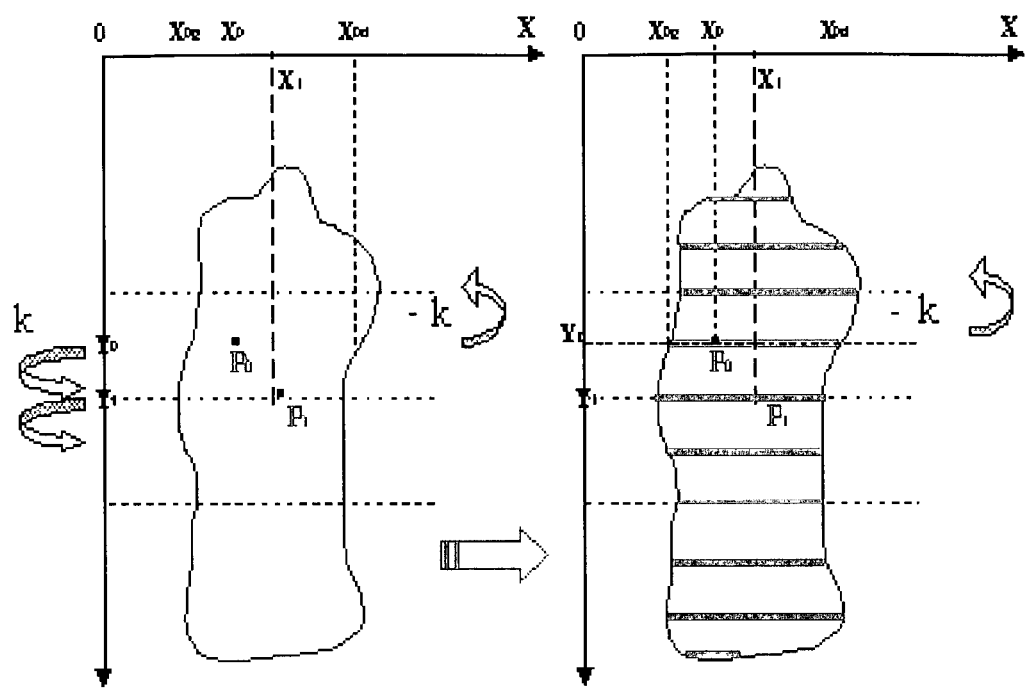
FIG. 2 is a schematic view for explaining the replenishment.

To explain this step, reference is made to FIG. 2.

Figure 3A:
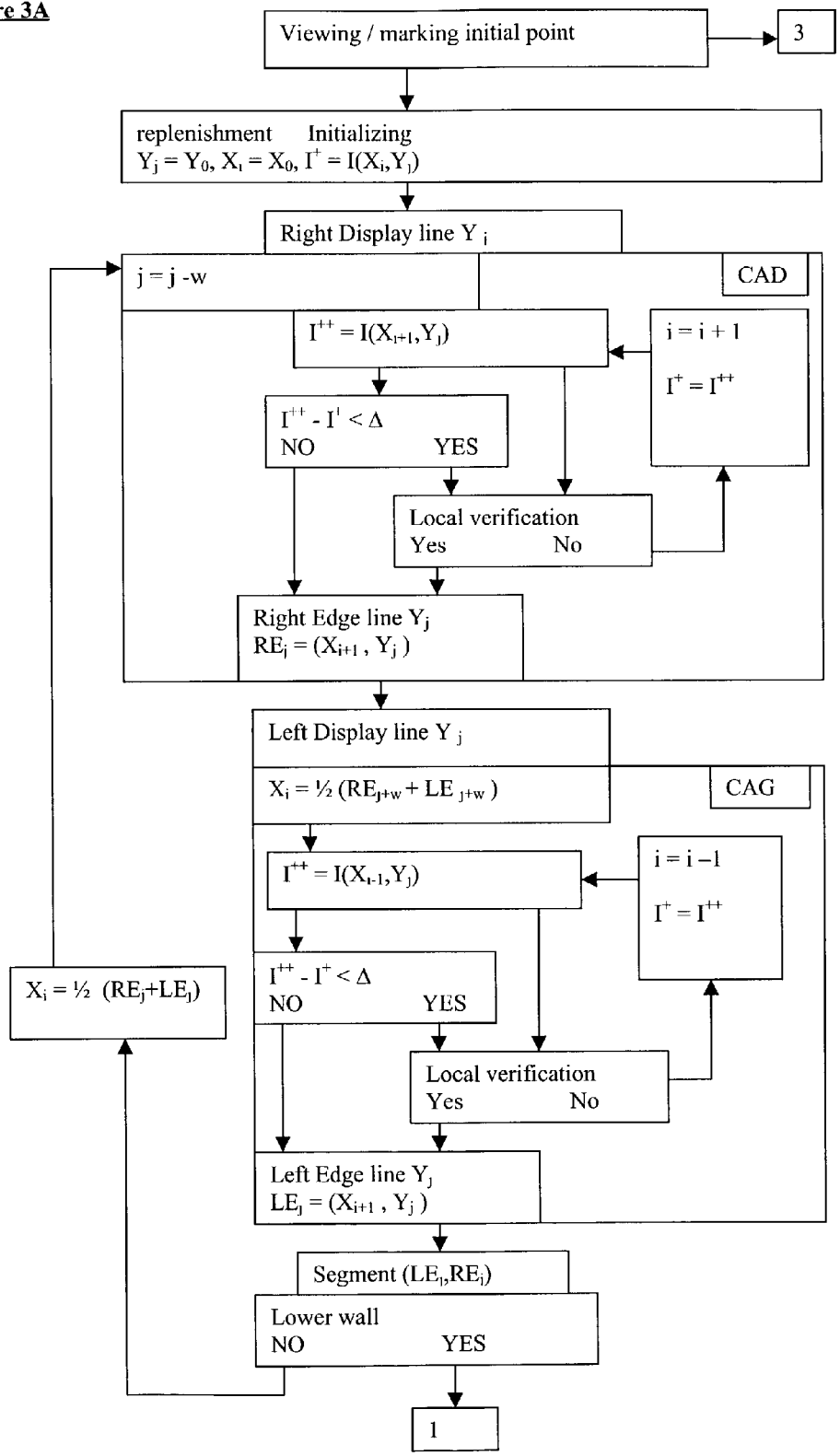
FIGS. 3a, 3b and 3c are schematic view of the replenishment step, the dynamic discrete contour model (DDCM) and the data calculation.
Figure 3B:
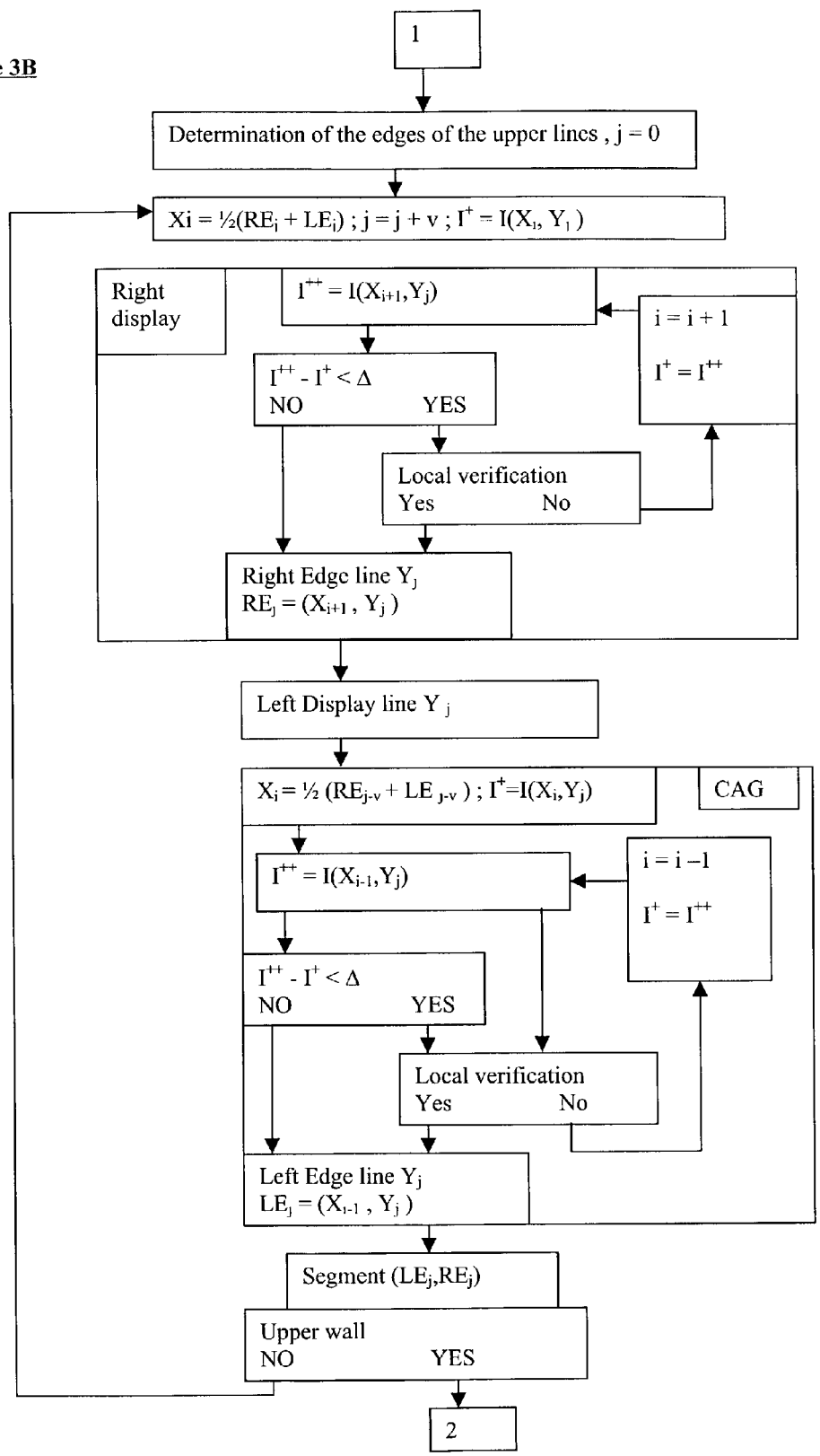
Figure 3C:
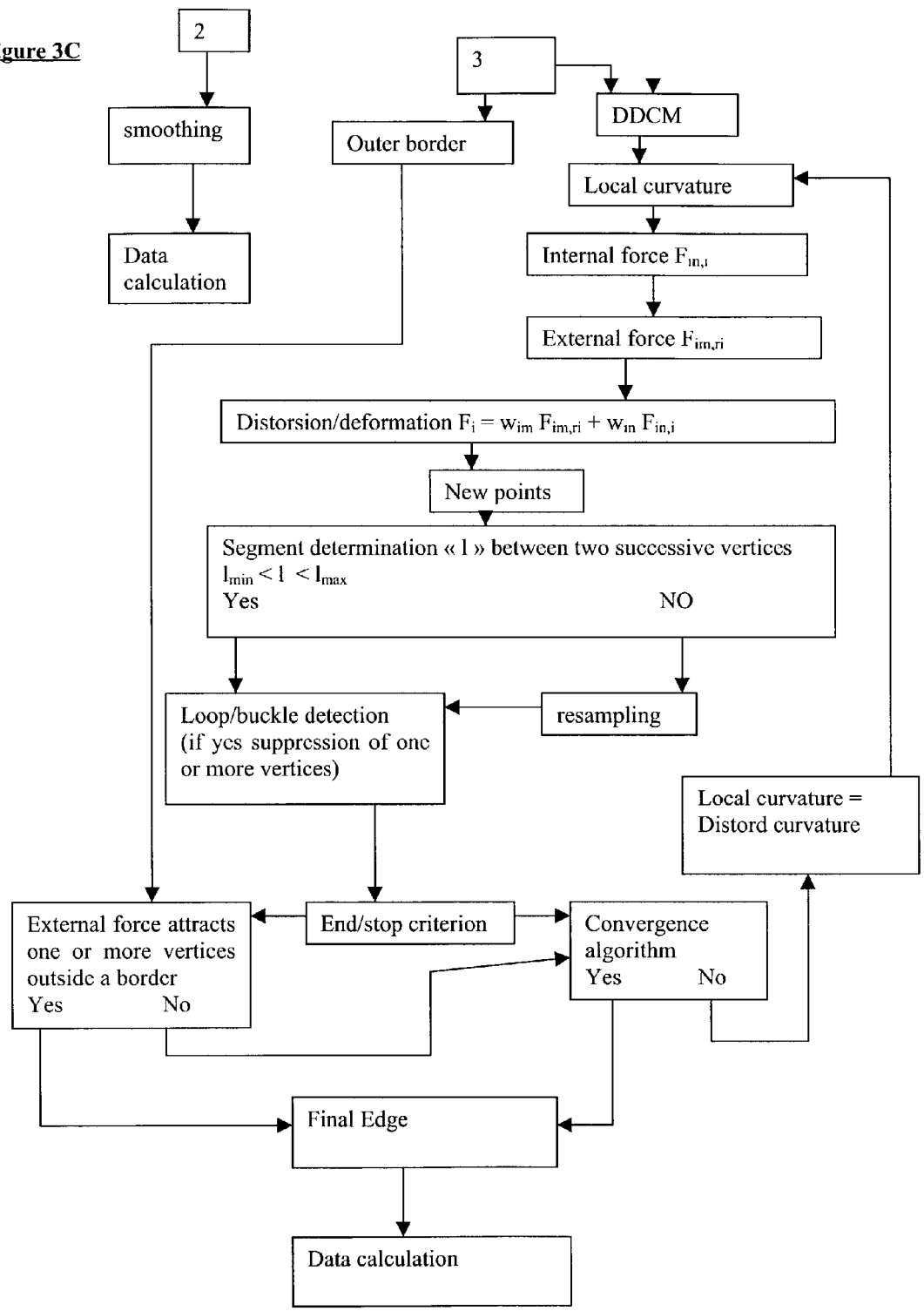

P0 represents the starting point of this step for the image considered, image 1 or image 2. This point selected inside the viscera will not affect the nature of the final edge. The point P0 has the X-Y coordinates X0, Y0 (abscissa X0, ordinate Y0). From this point P0, the points on the line Y0 located at the right of point P0 are browsed, until the right edge X0D is reached. This step is represented in FIG. 3a by "right display" initializing the browsing step in the right direction, and controlling by means of a control algorithm the iteration of the right browsing step as long as the right edge is not reached.

When the right edge X0D has been reached, the points on the line Y0 located at the left of point P0 are browsed, until the left edge X0G is reached. This step is represented in FIG. 3a by "left display" for the initialization of the browsing in the left direction, and for controlling by means of a control algorithm the iteration of the left browsing step as long as the left edge is not reached.

In order to minimise the risk of considering noise as pixels of edge (residues of the pretreatment), the algorithm introduces some criteria to assess the reliability of the viscera edge. For these purposes, the control algorithms right (CAD) and left (CAG) are cooperating with algorithm instructions for stopping the browsing step at a point for which the edge contour is not recognizable.

The CAD algorithm (suitable for stopping the further browsing in the right direction) determines successively the intensity $I^{++}$ of a pixel $P_{i+1}$ situated on the right side of the preceding point $P_i$ ($P_0$ or the starting point when analysing $P_1$). The program determines then the correlation of intensity $I^{++}$ of the pixel $P_{i+1}$ located at the right of the pixel $P_i$ with the intensity $I^+$ of the pixel $P_i$. If the difference ($I^{++}-I^+$) is not lower than a preset value ((low correlation) (No), the pixel $P_{i+1}$ is considered as being the right edge for the line considered, whereby the left edge (left display) will be determined for the line considered. If said correlation is considered as low (the difference $I^{++}-I^+$ being low) (Yes), a local verification will be done in order to determine whether said high correlation is due to noise or whether the pixel $P_{i+1}$ is at a maximum possible end pixel for the viscera for the line considered. If said local verification determines that $P_{i+1}$ is the maximum end pixel or that the high correlation is only due to correlation of the noise, $P_{i+1}$ is considered as being the right edge (Yes). If not (No), a pixel located at the right of $P_{i+1}$ will be analysed according to said algorithm, by means of an iterating step with redefinition of i as i+1 and $I^+=I^{++}$. A local verification will also directly be done in order to stop directly the right edge determination as soon as the point is considered as outside of a border.

The CAG algorithm works on the same manner as the CAD algorithm, except that it treats pixels located at the left side of P0 for the line $Y_j=Y0$.

When the left edge LEj and the right edge REj are determined for the line considered $Y_j$, all the pixels between said ends LEj and REj are coloured so as to define a segment of said line $Y_j$ (step Segment).

After a segment of the line $Y_j$ is coloured, a control instruction "lower wall" will be carried out so as to determine whether the line considered $Y_j$ corresponds to the lower wall. If not (No), the right display, the left display and the segment steps will be carried out for the line $Y_{j-w}$. The distance between the line $Y_j$ and $Y_{j-w}$ corresponds to a number of pixels (w). If said distance is small (for example equal to one pixel, w=1) the precision will be very high, but the treatment will require more computing time. If said distance w corresponds to a too large number of pixels, there will be no precision. The distance between two adjacent lines ($Y_j$, $Y_{j-w}$) is advantageously less than 10 pixels, preferably less than 5 pixels, for example 1, 2 or 3 pixels. For starting the treatment of the line $Y_{j-w}$ the starting point for the determination of the right and left end points is considered as being function of the left end and right end of the preceding line ($X_{-1}=(X0D+X0G)/2$), or $X_j=(LEj+REj)/2$ with $Y_j$ equal to $Y_{j-w}$. The determination of the REj and LEj for the new line $Y_j$ and the segmentation will then be carried out.

In case the lower wall is detected (Yes), the lines located above the line Y0 will be analyzed. The starting point for the analysis of the upper lines will be calculated after an initializing step j=0: $X_j=(LEj+REj)/2$ for the line $Y_j$. $Y_j$ will then be replaced by $Y_j=Y_{j+v}$ (with v equal or not to w, but advantageously equal to w, such as 1). The right display, left display and segment will now be carried out for the new line $Y_j$ considered as done for determining the edges of the lower lines (as described in FIG. 3a).

When the right edge and the left edge and segmentation step have been carried out for the line $Y_j$, the program will control whether said line $Y_j$ is the upper line. If the line $Y_j$ is not the upper wall, a further line will analyzed for determining the right edge, the left edge and for carrying the segmentation. This is done by an iteration step, with determination of $X_j$ as (LEj+REj)/2, and then by incrementing the value of j (j=j+v).

When the upper wall is detected (Yes), the edge and the surface area of the organ is extracted. The edge of the organ is obtained by linking successively for the lines analyzed ($Y_j$) the right edge points together and the left edge points together, as well as the left edge point and the right edge point of the lower wall line, as well of the upper wall line. When w=v=1, the edge of the organ is directly defined.

The extracted contour and surface of the organ can then be post treated so as to smooth the contour of the organ and to obtain a final edge. For example such a post treatment is carried out by dilation/erosion algorithm.

Data are then determined on said final image of the organ, so as to determine the perimeter, the area, the centre of gravity, the orientation, etc.

This replenishment step is carried out successively or simultaneously for the image 1 and the image 2.

The replenishment step does not depend from the abscissa P0 of the starting point as when iterating the analysis, the starting point depends on the abscissa of the right edge and left edge of the preceding line analysed.

After the replenishment step is ended, the viscera is advantageously extracted from the image for the further treatment of the image, for example for the post treatment or for calculation of the centre of gravity, the inclination, etc.

The Dynamic Discrete Contour Model

This model determines the edge by using a technique of active contour. The extraction of the viscera is followed by the determination of the features which provide information about the evolution of the organ between two extreme positions, such as the exhalation and the inhalation.

Vertical and horizontal shifts, variation of the inclination, surface, perimeter, gravity centres, etc. are studied in this respect.

Starting from an initial point or shape, which is created with a minimum of user interaction, the dynamic contour model modifies its shape to evolve towards the desired contour. The driving force leading to the shape deformation is calculated from a so called internal force that is derived from the contour model itself and from an external force that is derived from the main characteristics of the image.

In order to determine the features, aside from the organ as a whole, parts of viscera are advantageously compared in order to have a more precise idea of the movement between the two extreme positions. A stomach for example is first compared on the first third and then on the two remaining thirds. It should be noted that the comparisons of the gravity centres which give horizontal and vertical displacement take into account the patient movement correction. Results are indeed, if possible, based on a stationary reference of the patient, determined in advance such as a bone. The shape of the bone is determined by using the same algorithms as for a viscera with a contrast adaptation because bones generate more noise and are less contrasted.

This reference allows to exactly superpose the organs regardless of the patient's moving or of the image acquisition technique.

When the complete contour is defined by this method, main features of the organ, viscera are determined, such as the perimeter, the area, and the centre of gravity as well as the orientation of the viscera. The extreme positions (inhalation and exhalation) are then compared in terms of coordinates of centre of gravity in a given coordinate system and inclination of a given axis, preferably the principal axis of the contour. The so derived movement is subsequently compared to prescribed physiological movements.

This method starts from an initial point (one click of the mouse of the computer on a point belonging to the object to be analysed) or shape (for a few click on points belonging to the object), which is created with a minimum of user interaction, for example determined by the replenishment method. The dynamic contour model modifies its shape to evolve towards the desired contour. The driving force leading to the shape deformation is calculated from internal forces, derived from the shape of the contour model itself, and from an external force field derived from the main characteristics of the image.

The internal force will try to minimize local contour curvature while the external forces will try to make the model follow a valley or a ridge through the landscape. The deformation process is organized in a number of discrete steps; after each of them, the situation is analyzed with respect to position, velocity, and acceleration for each of the vertices. In this evaluation, internal and external forces on a vertex are calculated from the position of the vertex and its neighbours. These forces result in an acceleration, which changes the velocity of the vertex. This velocity determines the displacement of the vertex during the next deformation step. After a given number of deformation steps, a final stable situation will be reached and will be characterized by an equilibrium such that the velocity and the acceleration are nulls for each vertex. When described in term of energies, this situation represents a local minimum in the energy function.

The method will now be described more specifically.

Forces and Force Field

Figure 4:
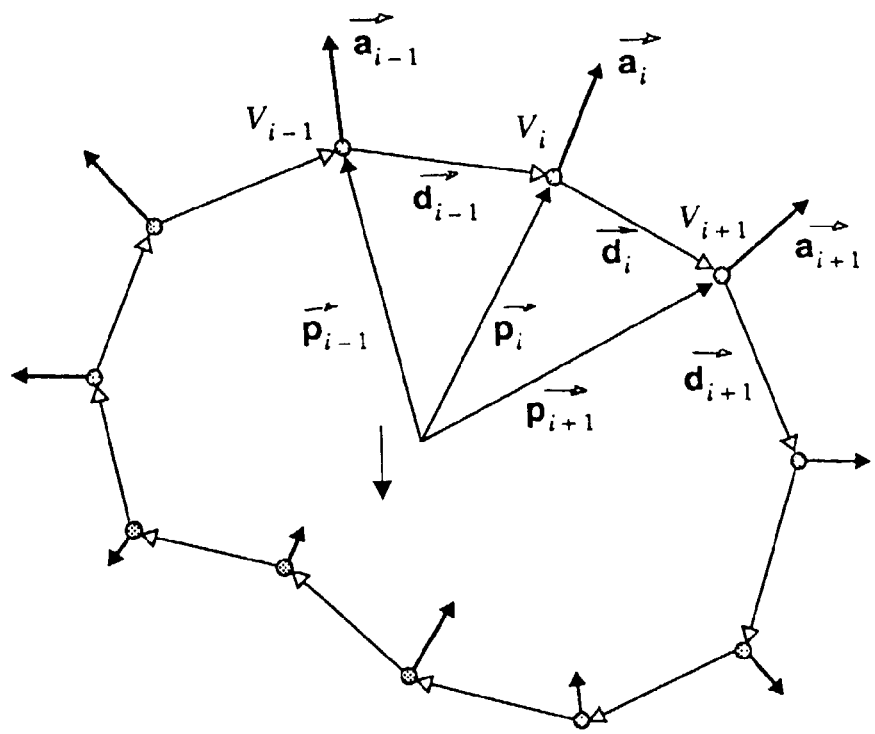
FIG. 4 is a schematic view of a portion of the model contour.

FIG. 4. represents the structure of the model: an organized contour of vertices $V_i$, $V_{i+1}$, . . . connected by a line or a segment having a length $d_i$, $d_{i+1}$, . . . The position of each vertex (Vi, $V_{i+1}$, . . . ) is represented by a vector ($\vec{p}_i$, $\vec{p}_{i+1}$, . . . ), while the edge between two successive vertices ($V_i$ and $V_{i+1}$; etc.), by a vector ($\vec{d}_i$, etc) (Cartesian coordinates). The deformation of the model is caused by the combination of forces acting on vertices. The acceleration on the vertex $V_i$ is noted by a vector "$\vec{a}_i$". "$v_i$" will represent the speed to the $V_i$ vertex (not shown on the diagram of FIG. 4). Length $d_i$ on an edge between two vertices ($V_i$, $V_{i+1}$) of two successive segments represents the local resolution of the model: if it is large, the model will not be able to follow the weak variations of energy in the image feature.

In order to preserve a limited variation, the length of the edge ($d_i$) is evaluated at regular intervals and if necessary, some vertices are withdrawn or inserted while keeping a resolution in a specified range. This is described in the section "Resampling".

Internal Forces

Figure 5:
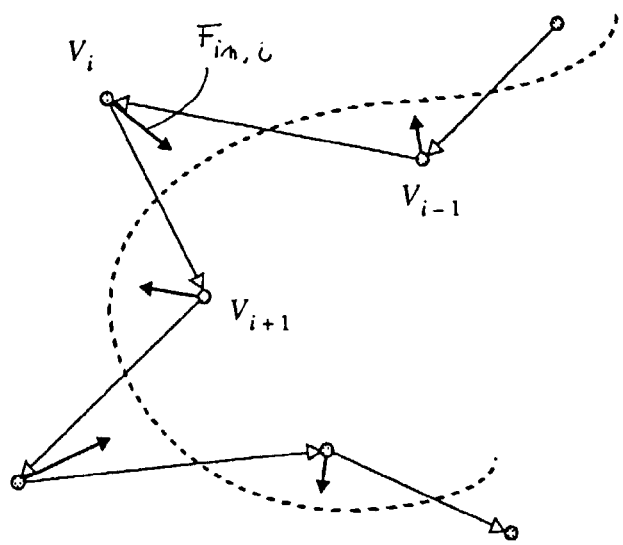
FIG. 5 shows the internal forces at vertices and valleys of the model contour.

The internal forces ($F_{in,i}$ at the vertex $V_i$, etc.) are used to minimize the local curvature of the contour (FIG. 5.). The introduction of this concept allows for an effect of smoothing on the contour.

Strictly speaking, the local curvature is null on a right segment between two vertices but is not defined precisely (first-class discontinuity) on a vertex.

In the method, the local curvature is calculated or estimated on the vertex by the difference between the two directions of the segments joining it. The segment leaving from the $V_{i-1}$ vertex (towards the vertex $V_i$) is represented by the vector $\vec{d_{i-1}}$; its direction by the unit vector $\vec{d_{i-1}}$.

Figure 6:
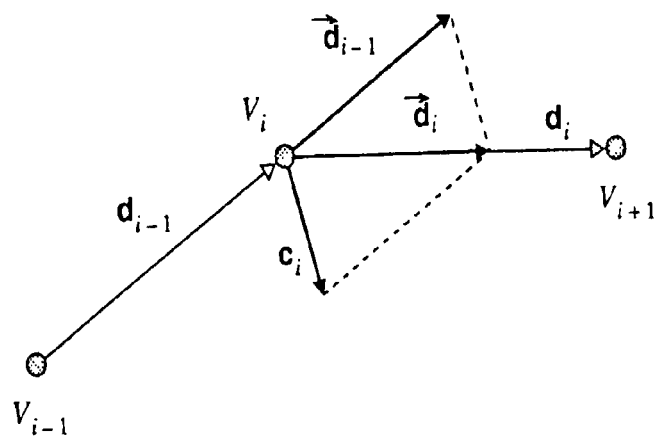
FIG. 6 is a schematic graph showing the local curvature for a vertex extending between two points of the model contour.

According to the described definition, the local curvature $c_i$ on the vertex $V_i$ is determined as being the vector component $c_i$ necessary so that the sum of the vector $c_i$+the vector $\vec{d_{i-1}}$ is equal to the vector $\vec{d_i}$. (see FIG. 6.)

Vector $c_i$=vector $\vec{d_i}$−vector $\vec{d_{i-1}}$

The local curvature $c_i$ has a length as well as a direction, giving a measure unique and usable of the angle between the two segments ($d_{i-1}$, $d_i$). Besides, the length of the vector local curvature $c_i$ depends solely on this angle, and is not influenced by the length of the two segments joining the vertex.

Figure 7:
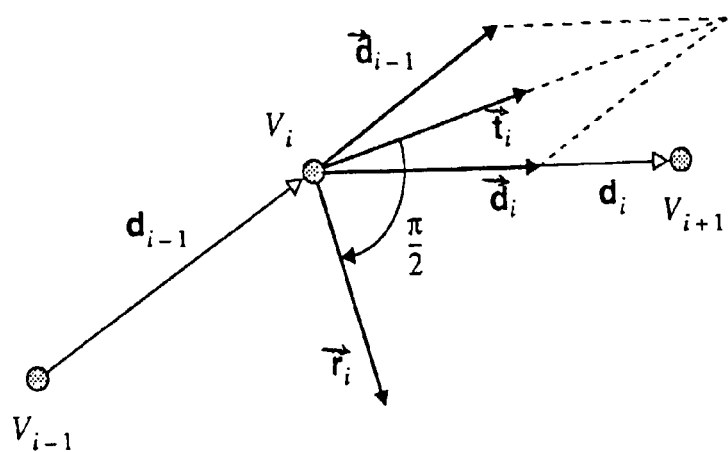
FIG. 7 is a graph similar to FIG. 6 showing the determination of the radial unit vector.

The radial vector $\vec{r_i}$ and the tangential vector $\vec{t_i}$ with respect to the position of the vertex $V_i$ can be defined. In order to define the tangential unit vector $\vec{t_i}$, we use the normalized sum of the unit vectors joining edge segments (FIG. 7.)

Vector $\vec{t_i} = (\vec{d_i}+\vec{d_{i-1}})/\|\vec{d_i}+\vec{d_{i-1}}\|$

The radial unit vector is given by a rotation of $\pi/2$ radians:

$$\vec{r_i} = \begin{bmatrix} 0 & 1 \\ -1 & 0 \end{bmatrix}$$

As seen in FIG. 7, vector $\vec{t_i}$ extends in a direction between the direction of the vectors $\vec{d_{i-1}}$ and $\vec{d_i}$, while the radial vector $\vec{r_i}$ extends in a direction perpendicular to the tangential vector at the vertex $V_i$.

Figure 8:
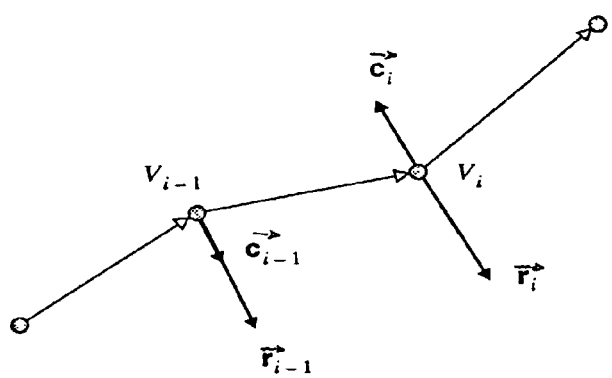
FIG. 8 shows the curvature and local coordinates for successive points of the contour model.

Vectors $\vec{t_i}$ and $\vec{r_i}$ represent a system of local coordinates (r, t) at the $V_i$ vertex suitable for determining the internal and external forces at vertex $V_i$. When using this system of coordinates (r,t) to define the local curvature $c_i$, it has to be noted that this vector $c_i$ is oriented in the direction of the radial vector ($\vec{r_i}$) or in the opposite way. In other words, the vector $c_i$ is oriented with respect to the axis of the radial vector $r_i$ and its length is derived from the product ($c_i$. vector $\vec{r_i}$). Let us use the fact that the length of curvature vectors $c_i$ can be either positive or negative $c_i$=($c_i$. vector $\vec{r_i}$). vector $r^i$((see FIG. 8.).

After defining the local curvature "$c_i$" as a one-dimensional variable vector $c_i$ (in the direction of the radial vector $\vec{r_i}$), the internal strengths will be defined, said internal strengths acting on vertices of the model to limit the deformation.

To clearly assess the influence of the internal forces on the deformation of the model, a situation with no external forces will be considered.

From FIGS. 5 to 8, it can be observed that the internal forces and the curvature vector are closely bound. These are two vectors $F_{in,i}$, $c_i$ oriented in the same direction. However, it can be dangerous to define the internal forces $F_{in,i}$ as being proportional to vectors of local curvature $c_i$.

Indeed, for simple shapes, such as shown in FIG. 9a, in the absence of external force, the hexagonal shape can be distorted in shapes having a local curvature minimum everywhere, e.g. a circle (or a symmetrical polygon due to discretization process). In this case, the process does not stop and continuously displaces the vertices towards the centre of the model (FIG. 9a). During this phase, the model shrinks (shrinking) while the local curvature is not affected, contrary to the role of the internal forces, i.e. acting to reduce the local curvature.

In order to avoid this problem, a second constraint is added. This acts like an elastic force that preserves the distance between vertices of the neighbourhood in certain limits. This strength will act on vertices that are migrating towards each others by stopping the shrinking process. The point where the shrinking is observed depends on the weight assigned to the forces of the two internal constraints. In other words, the effects coming from the elastic internal forces and the minimisation of the local curvature are balanced.

This is still not possible in the presence of the external strength, as shown below. In order to avoid the introduction of the second constraint (more artificial), we looked for an alternative definition of the minimization forces of the local curvature.

As demonstrated before, FIG. 9a, in the absence of external force, the contour will be reduced to a single point if internal forces proportional to the local curvature are taken into consideration.

The contour of FIG. 9b is facing the same problem.

If a force proportional to the local curvature is applied, the contour will become shorter (in term of length).

Besides, as is the case for FIG. 9a, the local curvature is not reduced but simply displaced.

FIG. 9c does not encounter such a problem since this represents a typical situation for which a local curvature reduction is required.

On the right side of FIGS. 9a, 9b, 9c, the shapes are represented in a local set of coordinates r, t.

In view of the representation of the shapes in (r,t) coordinates, it is proposed in the method to consider the internal forces (vectors) $F_{in,i}$ acting on the $V_i$ vertices must have the same direction (radial) than that of the curvature vectors $c_i$. This means that the internal forces are derived from the curvature vectors by simply modifying their length. Secondly, in order to reduce the local curvature $c_i$ without affecting surfaces where the curvature $c_i$ is constant, the length of the internal force $F_{in,i}$ has to be vanished where the contour reaches a constant curvature.

The two conditions can be fulfilled if we consider the sequence ($c_i$. vector $\vec{r_i}$) along the contour as a discrete scalar function, depending on the i position and if the product of convolution of this function with a discrete filter $k_i$ as the representation of the lengths sequence of the internal forces vectors $F_{in,i}$ is used.

$F_{in,i} = (c_i. \text{ vector } \vec{r_i}) \times k_i$

The first condition can be filled when using vector $r_i$ for the direction of $F_{in,i}$.

$F_{in,i} = F_{in,i}. \text{ vector } \vec{r_i}$

The second condition is verified when choosing some suitable coefficients for the $k_i$. A large class of filter can be used. According to experimental results obtained on test images, a constant $k_i = \bar{k} = 0.5$ is quite appropriate.

Other values can be used if required, for example after experiments.

Figure 10:
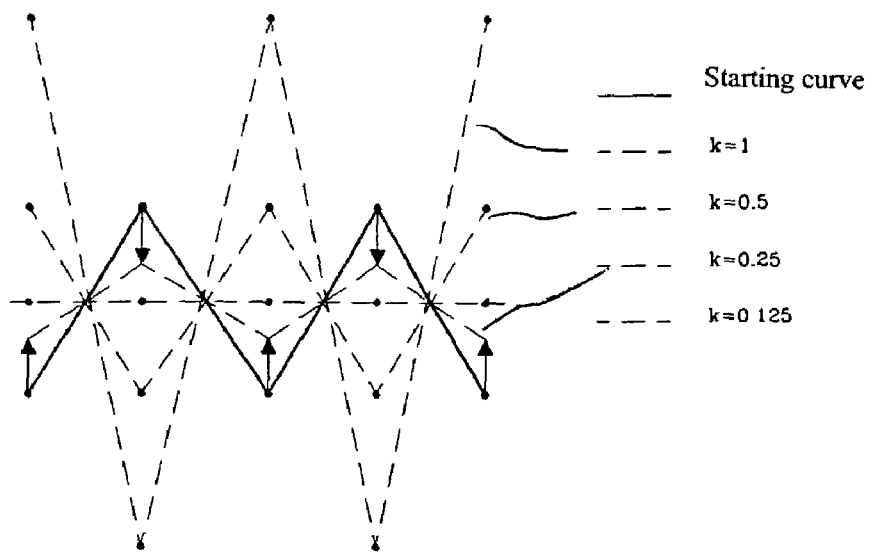
FIG. 10 shows the influence of a filtering on the internal force vectors.

FIG. 10 shows the influence of various value k for the $k_i$ factor. As it can be seen from said figure, a factor $k_i = 0.5$ is a good compromise between the reduction of the curvature and the number of iteration in order to reach the required curvature.

Figure 9:
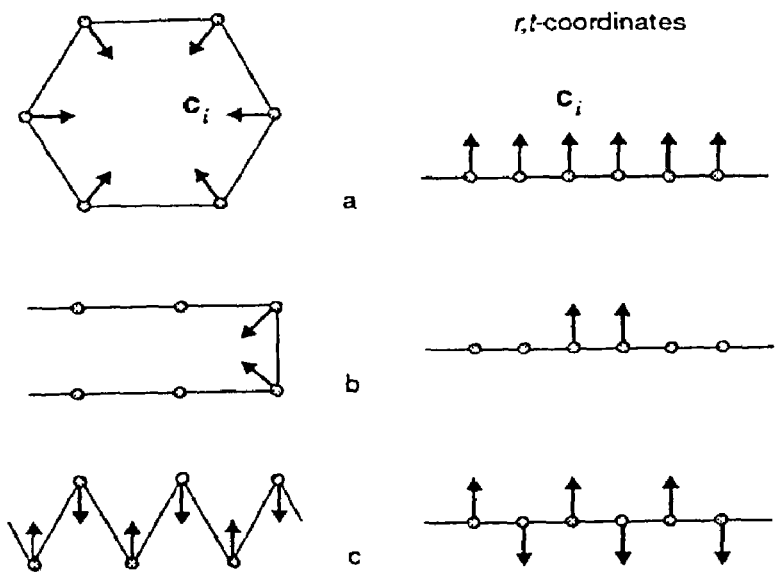
FIGS. 9a, 9b, 9c are simple shapes with their curvature vectors, said shapes being further expressed in r,t coordinates.
Figure 11:
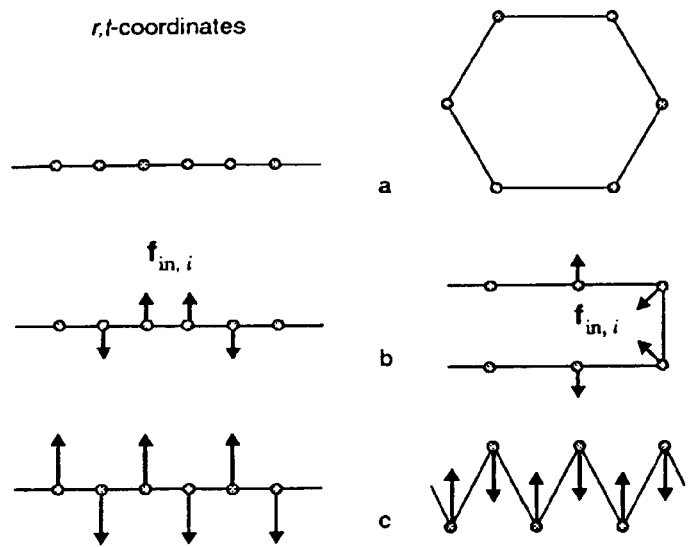
FIG. 11 shows the internal force vector for the shapes of FIGS. 9a, 9b and 9c.

FIG. 11 shows internal force $F_{in,i}$ vectors for the shapes shown in FIG. 9. The left side describes the internal forces in coordinates r, t.

The internal forces as defined hereabove enables a suitable deformation of the contour in the absence of external forces.

The method uses also external forces, as disclosed here after.

External Forces

The role of external forces is to deform the model. They are defined in term of potential energy of distribution that represents energy or more precisely the force of an image feature, preferably significant features of the images such as the pixel, the value of grey, and/or the value of the gradient.

If it is required that the model follows the path of the maximum gradient, the gradient like a characteristic of the image can be expressed, while defining an energy of distribution that would large when the given characteristic reaches high values. One would represent the path of the maximum gradient like one ridge in the energy of distribution. The normal behaviour of the distortion process is that it tends to drive the vertices to a local minimum of distribution energy. For the entire model, this means that the path follows the weak energy regions or a valley through the landscape of energies. This implies that if the model has to follow a ridge, the energy of distribution has to be reversed. Assuming Eim is the potential energy of resulting distribution, the force field driving an object in the direction of weak energy writes:

$$F_{im} = -\nabla E_{im}$$

In case there is no internal forces, the application of this relation ends up with a contour joining the local minima along a valley.

If the force fields described above $F_{im}$ are applied, the force $F_{im,Vi}$ (force at the vertex $V_i$) will have a component perpendicular to the local direction (radial component), but also a component along the path of the model (tangential component).

If there are no restrictions on the curvature of the model, the final situation will be a contour passing by the local minima of the external energy of contribution and the field will be located along the path of the contour. The tangential components will thus make the vertices moving along the contour and forming a Cluster.

In order to avoid this problem, it is proposed to introduce an elastic force, so as furnish an answer to the clustering. In this situation, the size of the elastic force is advantageously tuned locally to the size of the external force $F_{im,Vi}$ at the $V_i$ top. The solution to the clustering corresponds to the one suggested above with the "shrinking", namely the displacement of vertices along the contour doesn't bring any contribution to the deformation of the model. As a result, $F_{im,Vi}$ will not be directly used, but said force will be decomposed in its radial component and its tangential component, only the radial component $F_{im,ri}$ being used. The length of said radial component is equal to the product of $F_{im,Vi}$ and vector $\vec{r}_i$ $$F_{im,ri} = (F_{im,Vi} \cdot \text{vector } \vec{r}_i) \text{ vector } \vec{r}_i$$

The local radial forces $F_{im,ri}$ (external) and $f_{in,i}$ (internal) provide the resulting force that acts on the vertex only by deforming the model, without any movement of vertices along the contour.

In practice, to define the characteristic of the image or picture, a 5*5 neighbourhood pixel matrix centred on pixel i (x, y) of the model.

$F_{im,ri}$ is then determined as equal to $$\int_{im,r_i} = A \cdot [I(x,y) \otimes W] \text{ with } W = \begin{bmatrix} 0 & 1 & 1 & 1 & 0 \\ 1 & 1 & 1 & 1 & 1 \\ 1 & 1 & 1 & 1 & 1 \\ 1 & 1 & 1 & 1 & 1 \\ 0 & 1 & 1 & 1 & 0 \end{bmatrix}$$

with A is a multiplication coefficient, I(x, y) is the level of brightness of the pixel.

According to research made by the inventors, the pixel matrix W or vector W used in the above formula is the one offering the best results in order to favour different research direction for the contour.

In the case of an image (cavity in white, black contour), a high external force is associated to a pixel of the image corresponding to a cavity, while an external force of low value is representative of a contour.

Regions that have the largest external forces encourage the expansion of the curve), in contrast to the zones presenting weak external forces where the expansion has to stop. The external forces have still to be converted into displacement of vertices, si(being the vector displacement of the i pixel in the current iteration:

$$\bar{s}_i = -K_i \cdot \hat{r}_i \text{ where } \begin{cases} K_i = k1 \rightarrow F_{im,r_i}(V_i) < F1 \\ K_i = K2 \rightarrow F1 \leq F_{im,r_i}(V_i) < F2 \\ K_i = K3 \rightarrow F2 \leq F_{im,r_i}(V_i) < F3 \\ K_i = K4 \rightarrow F_{im,r_i}(V_i) \geq F3 \end{cases}$$

where K1, K2, K3, K4 are the constants that adjust the speed of expansion of the curve and have the dimensions of the pixel; F1, F2, F3 are constants that adjust the sensitivity to partitions and are measured in level of grey. These coefficients have been thoroughly tested to provide the following results:

K1=0 F1=100
K2=1 F2=150
K3=2 F3=200
K4=3

F1 is a gate to which the model is confronted.

Deformation, Resampling, Stop Conditions and Locking Up

Distortion or Deformation

The total force $F_i$ acting on a vertex is a weighted sum of internal and external forces. $F_i = w_{im} F_{im,ri} + w_{in} F_{in,i}$ The weights $w_{im}$, $w_{in}$ can be fixed to default values for a given application but can also be fixed as free parameters by the user. One is accentuating the role of external forces, namely to follow the features of the image more precisely, the other accentuates the influence of internal which is the smoothing process improvement.

Resampling

During expansion, the vertices of the curve have a tendency to move away and to induce a decrease in the geometric resolution. In order to avoid this, a parameter Ides representing the length wanted for one segment between two consecutive vertices is advantageously introduced. From $l_{des}$, two other parameters are derived $l_{min}$ and $l_{max}$, which are representing the minimum distance and the authorised maximum distance between two neighbouring vertices.

Figure 12:
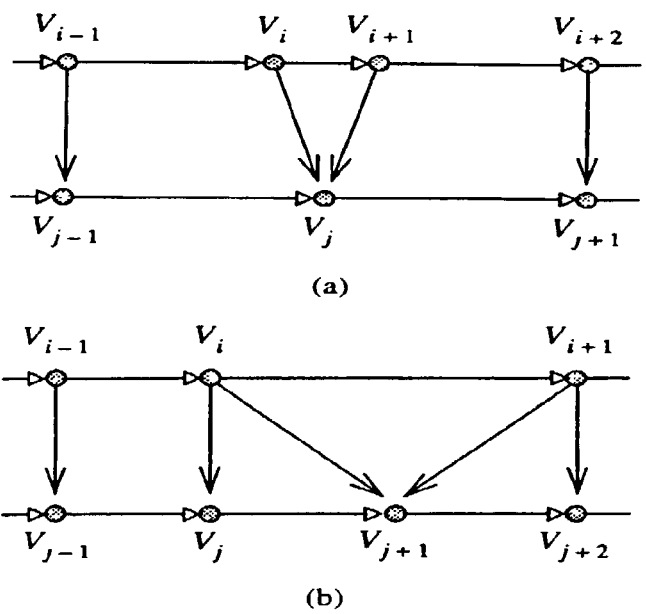
FIG. 12 shows schematically the working of external forces.
Figure 13:
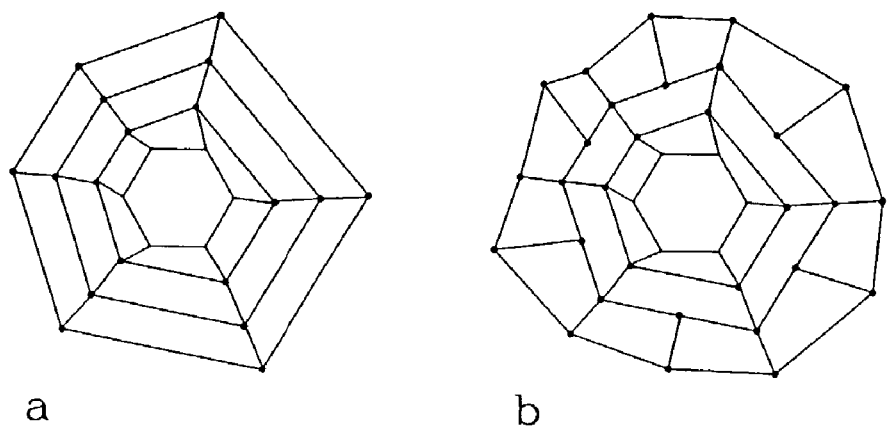
FIGS. 13 and 14 are view explaining the resampling and the buckles formation.

Before every expansion, the resampling is advantageously evaluated in two steps: the first one checks along of the contour that there is a segment smaller than the minimal length $l_{min}$. If it is the case, the segment is removed from the model and the two vertices are replaced by a single one located in the middle (see FIG. 9a). The second step verifies along the contour that there is a segment larger than the maximal length $l_{max}$. When this occurs, this segment is divided in two smaller ones of equal size (see FIGS. 12a and 12b, and FIG. 13 showing the difference between an expansion without resampling—FIG. 13a and with resampling—FIG. 13b).

By using $l_{min}=\frac{1}{2} l_{des}$ and $l_{max}=\frac{3}{2} l_{des}$, it is possible to avoid an oscillating behaviour for the model, that is that vertices are withdrawn in a step of resampling and are reintegrated in the following step.

Figure 14:
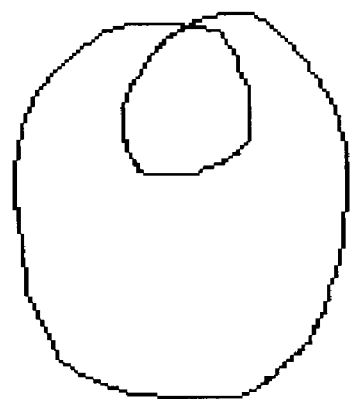
Figure 15:
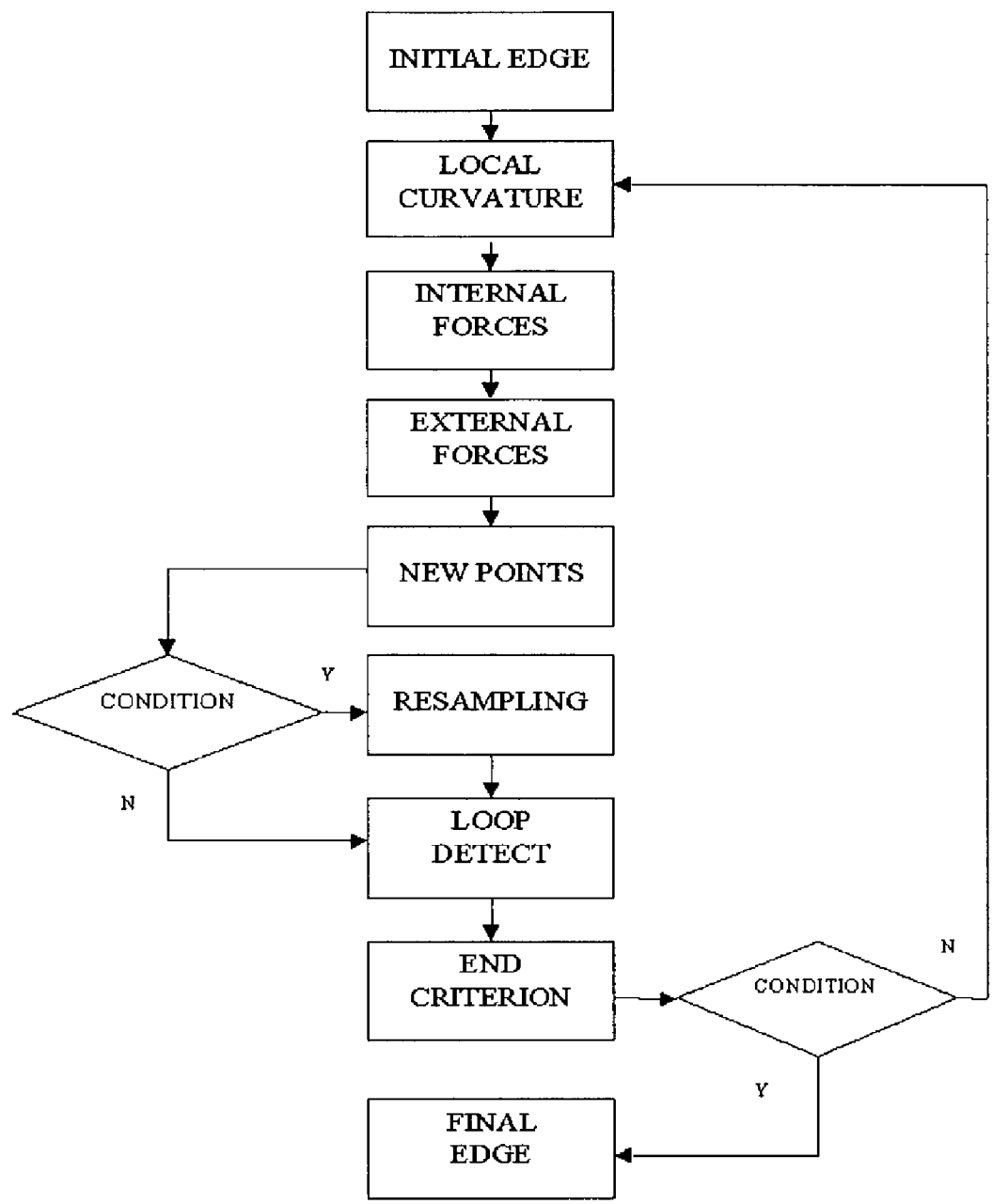
FIG. 15 is a schematic block diagram of the dynamic contour model algorithm.

Detection of Buckles (See FIG. 14)

Much often, due to noise induced by the pretreatment, some isolated points of the cavity correspond to maxima of the gradient, thus possessing a weak external strength that could stop the model in its expansion.

It has been observed experimentally that after some iterations, such a point can lead to the formation of buckles.

To avoid this problem, it has been found that it was sufficient to verify after the resampling that there are no vertices with interdistance lower than $l_{min}$. If one is found and fits the criteria, this means that they cross and that the model forms a buckle. As soon as it is detected, this buckle can be suppressed by eliminating the points of the model. Once the suppression of the buckle is done, the model finds a possibility to go beyond the initial barrier. The expansion of the model is therefore not too much influenced by noise points inside the cavity.

Automatic Stop

It has been found that the insertion of a stopping criterion can improve significantly the method. This criterion can be related to the immobility of points at the tops during a fixed number of iterations. In some embodiment, this criterion has not been inserted so as to enable the user the possibility of controlling him self the number of iterations.

The method is for example associated to stopping algorithm so as to stop the action of the attraction forces (internal and external) at a vertex, when the external force attracts a portion of the shape outside the outer border of the organ, said outer border being defined by the user by a few click on the images viewed on the computer screen or by linking top vertices there between, so as to not take into consideration the valleys. Said outer border is preferably defined by the user, for example by marking a few points on the screen (with the click of the mouse).

In the same way, a correlation is determined between two successive shapes and the stopping algorithm stops the attraction forces (internal and external) is lower than a predetermined value.

As specific example of stopping algorithm, reference is made to a convergence criterion algorithm based on the following average correlation factor (most probable):

$$\omega_{x,y} = \frac{CoefCorr(X, Y)}{\sigma_x * \sigma_y},$$

-continued where:

$-1 \le \omega_{x \cdot y} \le 1$ and $$CoefCorr(C, Y) = \frac{\sum_{i=1}^{n}(x_i - \mu_x)(y_i - \mu_y)}{n}$$

Such a stopping algorithm is suitable for stopping the grows-up iteration of the Dynamic contour model, as soon the desired contour is determined, and for avoiding to have a grows-up outside the desired contour.

The convergence algorithm works with two sets of points, namely an initial or previous set of points of the contour $(X_i, Y_i)$ and a final set or further set of points of the contour (i.e. a set of points after a grows-up from the initial or previous contour) $(X_{i+b}, Y_{i+b})$. b is the number of iterations done after the initial or previous contour and the further or final contour. For example, b is equal to 1, 2, 3, preferably equal to 2 or 3.

The first correlation will be done on the number of points (Ni) in the initial or previous contour with respect to the number of point in the final or later contour or actual number of points (Ni+b).

If the difference between said numbers is comprised between −Z and +Z, with Z a predetermined value, especially if said difference is equal to 0, the correlation equation defined here above will be applied.

By using this correlation equation, a control variable $\omega_{x,y}$ can be determined. When said variable is less than the expected control variable, the grows-up of the contour is stopped (contour is considered as being well defined), while when the variable is above the expected value, a new iteration step is carried out or several iteration steps (2, 3 or more) are carried out.

Figure 23:
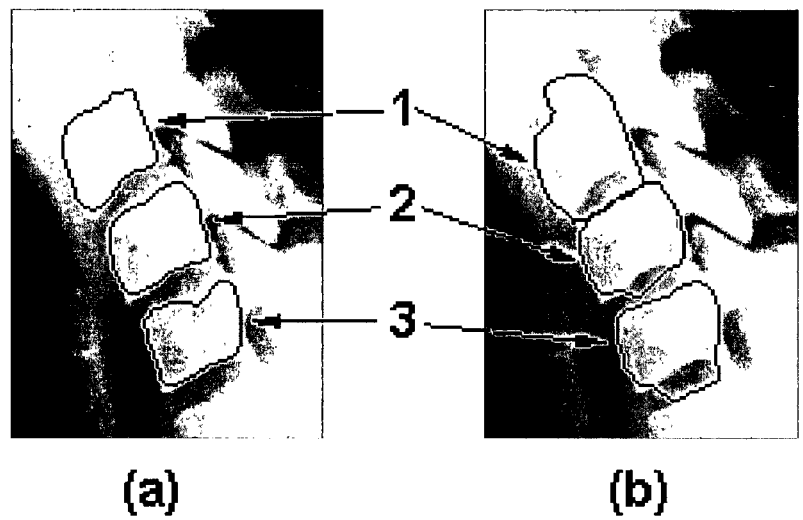
FIGS. 23a and 23b show vertebra locations obtained by a method of the invention with convergence criterion and by a method without convergence criterion.

FIG. 23 shows the importance of the convergence criterion when studying the vertebra location. When the convergence criterion is used in the method of the invention, the vertebra are well defined (FIG. 23a), whereby enabling a good analysis thereof, while when not using the convergence criteria, the vertebra are not correctly determined (FIG. 23b) and contact each other, whereby no precise analysis is possible.

It has also been observed that by using the convergence criterion in the method of the invention, the number of iterations for determining the location of the vertebra 1,2 and 3 was reduced by a factor of more than 2 with respect to the method of the invention not using this convergence criterion.

Examples of Application of the Preferred Method

Image 16a represents an organ (stomach) to study in expiration (left side) and inspiration (right side).

Said image will be analyzed with the preferred method disclosed here before (said method comprising an adequate pretreatment step for eliminating noise), as well as with manual contour extraction, so as to compare the results obtained by said two methods.

In order to study the displacement of the organ between the two extreme positions, two fundamental notions are at least required: the gravity centre and the principal axis. Centre of gravity is the point of the object where the gravity force applies. It coincides with the mass if the gravity fields are uniform. The gravity centre C (Cr, Cc) is the pixel having the same amount of object in any direction. Cr is the row centre and Cc is the column centre. If the object is constituted of N pixels, Cr and Cc can be computed by $$C_r = \sum \frac{X_i}{N} \text{ And } C_c = \sum \frac{Y_i}{N}$$

in which $X_i$ is the row position of image pixel and $Y_i$ is the column position of image pixel, i being comprised between 1 and N The principal axis of a binary object is the inertia axis passing trough the gravity centre of this object and having a minimal total distance with all the pixels of the object. This axis divides the surface in two equal parts, and around which the surface is balanced. This axis also passes through one of the contour pixels; its orientation is along the direction of the maximum extent of the object. Sometimes for computational reasons, we use the minus axis (perpendicular) as principal axis. It is not problematic for our application, since our interest focuses on the variation of the axis between the expiration and inspiration phases.

In addition of a global organ study, it has been proposed to cut organ in different part (⅓, ⅔) in agreement with osteopath doctor. The calculation on upper part (⅓) is based on the surface in pixels. The comparisons of gravity centre (give horizontal and vertical displacement) take in account the patient movement correction. Indeed, when it is possible, results are based on a stationary reference of the patient, i.e. bones. This reference permits to superimpose organs precisely without manual correction due to a patient movement during X-ray process.

Figure 16:
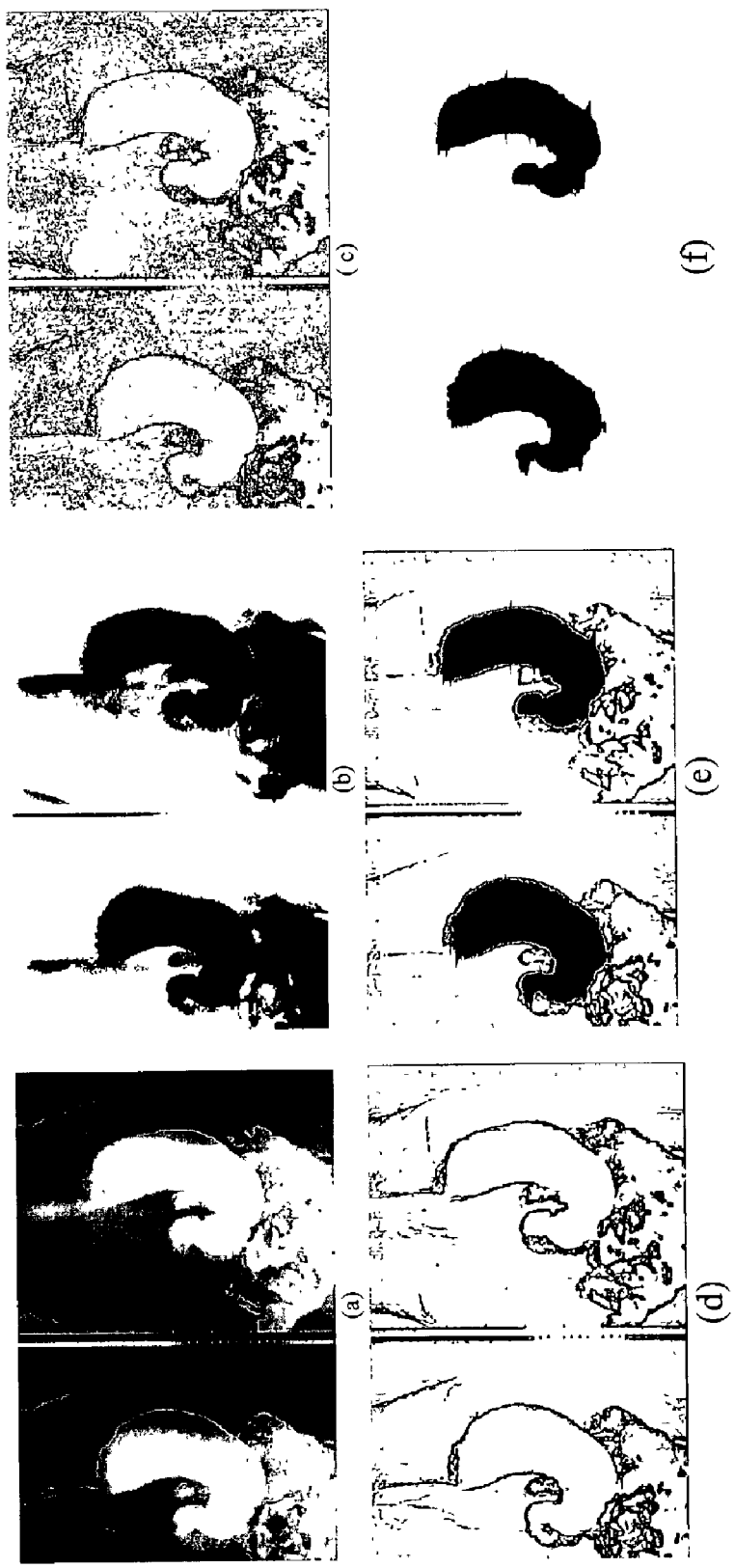
FIGS. 16a to 16f are views of the image after treatment steps.

FIG. 16b is the view of the image after image improvement.

FIG. 16c is the view of the image after detection of the left and right edges of the viscera.

FIG. 16d is the view of the image after smoothing the edges.

FIG. 16e is the view of the image after segmenting

FIG. 16f is the view of the extracted viscera, after the replenishment step.

Figure 17:
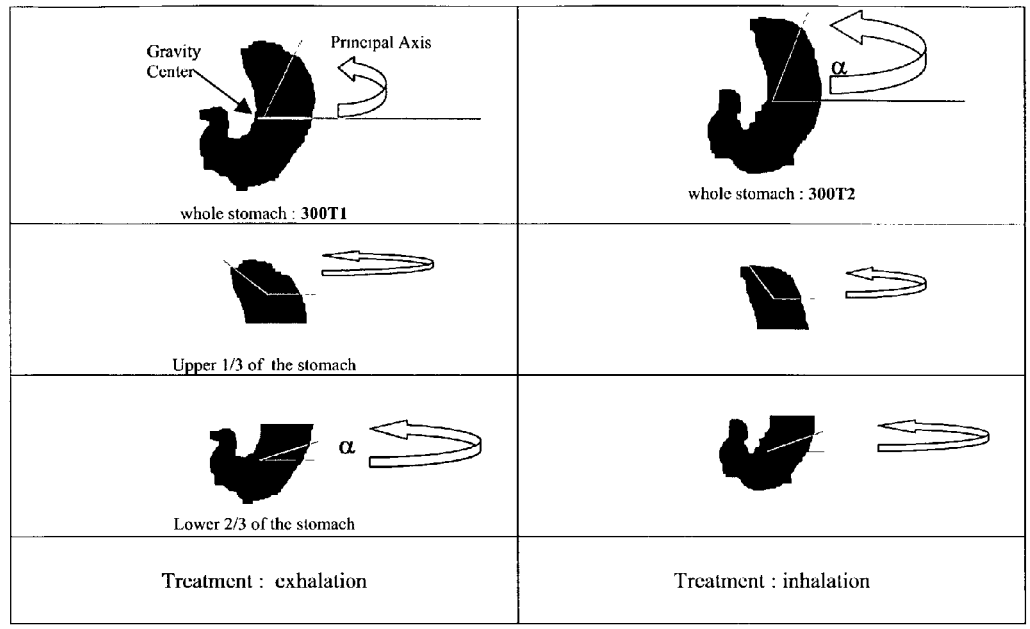
FIG. 17 shows parameters (centre of gravity, inclination α) which have been determined for the viscera in exhalation position and in inhalation position, said parameters being determined for the whole stomach, for the upper ⅓ of the stomach and for the lower ⅔ of the stomach;.

FIG. 17 shows parameters (centre of gravity, inclination α) which have been determined for the viscera in exhalation position and in inhalation position, said parameters being determined for the whole stomach, for the upper ⅓ of the stomach and for the lower ⅔ of the stomach.

Figure 18:
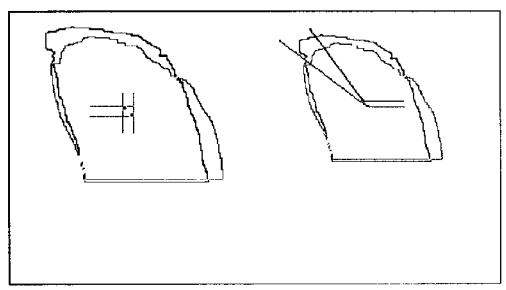
FIG. 18 shows the determination of the difference of the centre of gravity (row position X) and the difference of inclination for the ⅓ upper stomach between its exhalation position and its inhalation position.

FIG. 18 shows the determination of the difference of the centre of gravity (row position X) and the difference of inclination for the ⅓ upper stomach between its exhalation position and its inhalation position.

Figure 19:
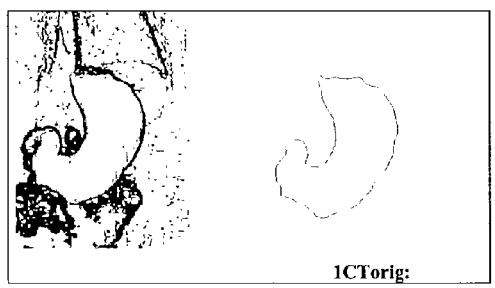
FIG. 19 shows on the left side the image of the viscera and the edge determination on said original image of the viscera (1CTorig)

FIG. 19 shows on the left side the image of the viscera and the edge determination on said original image of the viscera (1CTorig).

Figure 20:
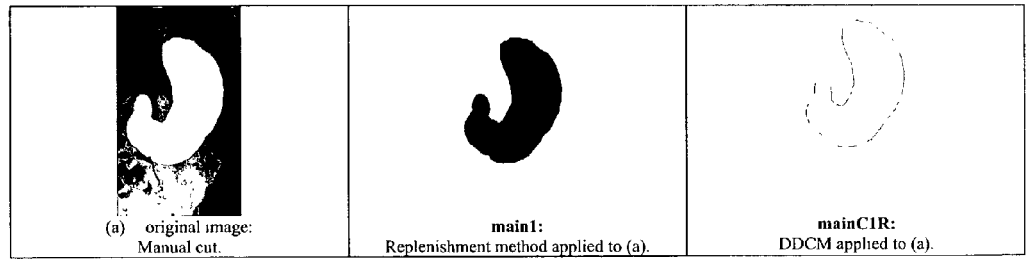
FIGS. 20a to 20c show respectively the difference between manual determination of the position of the viscera (FIG. 20a), the determination of the viscera after the replenishment step with extraction (FIG. 20b) and the determination of the position of the viscera after the DDCM (dynamic contour model) (FIG. 20c)

FIG. 20 shows the difference between manual determination of the position of the viscera (FIG. 20a), the determination of the viscera after the replenishment step with extraction (FIG. 20b) and the determination of the position of the viscera after the DDCM (dynamic contour model) (FIG. 20c). The manual determination is used for validating the method of the invention.

Table I gives the difference between automatic and manual extraction results given by Replenishement.

Principal axis is used to determine the angle α: the inclination axis between exhalation and inhalation. Table II gives the difference between DDCM and manual method.

Here we use the minus axis instead of principal axis to determine the angle α.

These tables give as difference between replenishment and DDCM and also with manual method. Remark, results are described in Pixel.

| exhalation position | inhalation position | difference exhalation − inhalation |
|---|---|---|
| Image: after replenishment manual analysis | Image: after replenishment manual analysis | Image difference: after replenishment manual analysis (Δmanual) |
| area: 32131 perimeter: 1214 whole stomach: CGx = 132 CGy = 209 α = 65.7° Upper ⅓ of the stomach CGx = 156 CGy = 128 α = 142° Lower ⅔: CGx = 120 CGy = 249 α = 21.6° | area: 31990 perimeter: 1230 whole stomach: CGx = 134 CGy = 205 α = 70.9° Upper ⅓ of the stomach CGx = 156 CGy = 116 α = 121.6 Lower ⅔: CGx = 123 CGy = 250 α = 24.9° | Δ area: 141 Δ perimete-16r: whole stomach: Δ CGx = −2 Δ CGy = 4 Δ α = −5.2° Upper ⅓ of the stomach Δ CGx = 0 Δ CGy = 12 Δ α = 20.4° Lower ⅔: Δ CGx = −3 Δ CGy = −1 Δ α = −3.3° |
| Image: after replenishment automatic analysis | Image: after replenishment automatic analysis | Image difference: after replenishment automatic analysis (Δ automatic) |
| area: 32164 perimeter: 1128 whole stomach: CGx = 134 CGy = 208 α = 66.5° Upper ⅓ of the stomach CGx = 156 CGy = 126 α = 142.7° Lower ⅔: CGx = 123 CGy = 249 α = 24.2° | area: 32310 perimeter: 1188 whole stomach: CGx = 135 CGy = 203 α = 71.6° Upper ⅓ of the stomach CGx = 156 CGy = 115 α = 124.4° Lower ⅔: CGx = 124 CGy = 247 α = 24.4° | Δ area: −146 Δ perimeter: 60 whole stomach: Δ CGx = −1 Δ CGy = 5 Δ α = −5.1° Upper ⅓ of the stomach Δ CGx = 0 Δ CGy = 11 Δ α = 18.3° Lower ⅔: Δ CGx = −1 Δ CGy = 2 Δ α = 0.2° |
| Image difference manual − automatic | Image difference manual − automatic | difference (Δmanual − Δautomatic) |
| ≠area: −33 ≠perimeter: 86 whole stomach: ≠CGx = −2 ≠CGy = 1 ≠α = −2.6° Upper ⅓ of the stomach ≠CGx = 0 ≠CGy = 2 ≠α = −0.7° Lower ⅔: ≠CGx = −3 ≠CGy = 0 ≠α = −2.6° | ≠area: −320 ≠perimeter: 42 whole stomach: ≠CGx = −1 ≠CGy = 2 ≠α = −0.7° Upper ⅓ of the stomach ≠CGx = 0 ≠CGy = 1 ≠α = 0.3° Lower ⅔: ≠CGx = −1 ≠CGy = 3 ≠α = 0.5° | ≠area: 287 ≠perimeter: −76 whole stomach: ≠CGx = −1 ≠CGy = −1 ≠α = −0.1° Upper ⅓ of the stomach ≠CGx = 0 ≠CGy = 1 ≠α = −1° Lower ⅔: ≠CGx = −2 ≠CGy = −3 ≠α = −3.5° |

This table 1 shows that the automatic analysis of the replenishment image as used in the method of the invention provides results with are similar to a manual analysis of said replenishment image, manual analysis requiring a very long time so as to be very accurate.

| exhalation position | inhalation position | difference exhalation − inhalation |
|---|---|---|
| Image: after DDCM: manual analysis | Image: after DDCM: manual analysis | Image difference: after DDCM manual analysis (Δmanual) |
| area: 30297 | area: 29982 | Δ area: 315 |
| perimeter: 813 | perimeter: 878 | Δ perimeter: −65 |
| whole stomach: | whole stomach: | whole stomach: |
| CGx = 132 | CGx = 134 | Δ CGx = −2 |
| CGy = 210 | CGy = 209 | Δ CGy = 1 |
| α = 153.4° | α = 161.3° | Δ α = −7.9° |
| Upper ⅓ of the stomach | Upper ⅓ of the stomach | Upper ⅓ of the stomach |
| CGx = 156 | CGx = 157 | Δ CGx = −1 |
| CGy = 132 | CGy = 123 | Δ CGy = 9 |
| α = 5.49° | α = 33.7° | Δ α = 21.2° |
| Lower ⅔: | Lower ⅔: | Lower ⅔: |
| CGx = 120 | CGx = 122 | Δ CGx = −3 |
| CGy = 250 | CGy = 252 | Δ CGy = −1 |
| α = 112.9° | α = 115.3° | Δ α = −3.6° |
| Image: after DDCM automatic analysis | Image: after DDCM automatic analysis | Image difference: after DDCM automatic analysis (Δ automatic) |
| area: 32266 | area: 33347 | Δ area: −1081 |
| perimeter: 1116 | perimeter: 1150 | Δ perimeter: −34 |
| whole stomach: | whole stomach: | whole stomach: |
| CGx = 133 | CGx = 135 | Δ CGx = −2 |
| CGy = 207 | CGy = 203 | Δ CGy = 4 |
| α = 156.4° | α = 162.3° | Δ α = −6.1° |
| Upper ⅓ of the stomach | Upper ⅓ of the stomach | Upper ⅓ of the stomach |
| CGx = 156 | CGx = 156 | Δ CGx = 0 |
| CGy = 126 | CGy = 114 | Δ CGy = 11 |
| α = 51.3° | α = 34.7° | Δ α = 16.6° |
| Lower ⅔: | Lower ⅔: | Lower ⅔: |
| CGx = 122 | CGx = 124 | Δ CGx = −2 |
| CGy = 249 | CGy = 247 | Δ CGy = 2 |
| α = 113.2° | α = 112.3° | Δ α = 0.9° |
| Image difference manual − automatic | Image difference manual − automatic | difference (Δmanual − Δautomatic) |
| ≠area: −1969 | ≠area: −3365 | ≠area: 1376 |
| ≠perimeter: −303 | ≠perimeter: −272 | ≠perimeter: −21 |
| whole stomach: | whole stomach: | whole stomach: |
| ≠CGx = −1 | ≠CGx = −1 | ≠CGx = 0 |
| ≠CGy = 3 | ≠CGy = 6 | ≠CGy = −3 |
| ≠α = −3° | ≠α = −1° | ≠α = −1.8° |
| Upper ⅓ of the stomach | Upper ⅓ of the stomach | Upper ⅓ of the stomach |
| ≠CGx = 0 | ≠CGx = 1 | ≠CGx = −1 |
| ≠CGy = 6 | ≠CGy = −9 | ≠CGy = −2 |
| Lower ⅔: | Lower ⅔: | Lower ⅔: |
| ≠CGx = −2 | ≠CGx = −2 | ≠CGx = 0 |
| ≠CGy = 1 | ≠CGy = 5 | ≠CGy = −3 |
| ≠α = −0.3° | ≠α = 3° | ≠α = −4.5° |

This table shows also that the automatic treatment after DDCM (Dynamic contour model) is accurate.

Tests have been made on other images for analysis the difference between the results obtained after DDCM and after replenishment, results obtained by automatic computing.

| exhalation position | inhalation position | difference exhalation − inhalation |
|---|---|---|
| | | Image difference (A − B): |
| Image A: after DDC automatic analysis | Image B: after DDC automatic analysis | after DDC automatic analysis (ΔDDC) |
| whole stomach: | whole stomach: | whole stomach: |
| CGx = 105 | CGx = 115 | Δ CGx = −10 |
| CGy = 191 | CGy = 205 | Δ CGy = −16 |
| α = 161.9° | α = 161° | Δ α = −0.9° |
| Upper ⅓ of the stomach | Upper ⅓ of the stomach | Upper ⅓ of the stomach |
| CGx = 140 | CGx = 154 | Δ CGx = −14 |
| CGy = 108 | CGy = 112 | Δ CGy = −4 |
| α = 166° | α = 171.2° | Δ α = −5.2° |
| Lower ⅔: | Lower ⅔: | Lower ⅔: |
| CGx = 87 | CGx = 96 | Δ CGx = −9 |
| CGy = 233 | CGy = 251 | Δ CGy = −18 |
| α = 25.2° | α = 31.5° | Δ α = −6.3° |
| Image C: after replenishment automatic analysis | Image D: after replenishment automatic analysis | Image difference (C − D): after replenishment automatic analysis (Δ replenishment) |
| whole stomach: | whole stomach: | whole stomach: |
| CGx = 105 | CGx = 116 | Δ CGx = −1 |
| CGy = 191 | CGy = 201 | Δ CGy = −10 |
| α = 161.6° | α = 71.6° | Δ α = −1.3° |
| Upper ⅓ of the stomach | Upper ⅓ of the stomach | Upper ⅓ of the stomach |
| CGx = 139 | CGx = 155 | Δ CGx = −16 |
| CGy = 108 | CGy = 108 | Δ CGy = 0 |
| α = 164.1° | α = 170° | Δ α = 5.9° |
| Lower ⅔: | Lower ⅔: | Lower ⅔: |
| CGx = 88 | CGx = 96 | Δ CGx = −8 |
| CGy = 233 | CGy = 248 | Δ CGy = −15 |
| α = 25.8° | α = 30.2° | Δ α = −4.4° |
| Image difference (A − C) automatic DDC-replenishment | Image difference (B − D) automatic DDC-replenishment | difference (Δmanual − Δautomatic) |
| whole stomach: | whole stomach: | whole stomach: |
| ≠CGx = 0 | ≠CGx = −1 | ≠CGx = −9 |
| ≠CGy = 0 | ≠CGy = 4 | ≠CGy = −6 |
| ≠α = 0.3° | ≠α = 0.7° | ≠α = 0.4° |
| Upper ⅓ of the stomach | Upper ⅓ of the stomach | Upper ⅓ of the stomach |
| ≠CGx = 1 | ≠CGx = −1 | ≠CGx = 2 |
| ≠CGy = 0 | ≠CGy = 4 | ≠CGy = −4 |
| ≠α = 1.9° | ≠CGx = 0 | Lower ⅔: |
| Lower ⅔: | ≠CGy = −3 | ≠CGx = −1 |
| ≠CGx = −1 | ≠α = 1.3° | ≠CGy = −3 |
| ≠CGy = 0 | | ≠α = −1.9° |
| ≠α = −0.6° | | |

The right-hand column contains the vertical label: REPLENISHMENT

Figure 21:
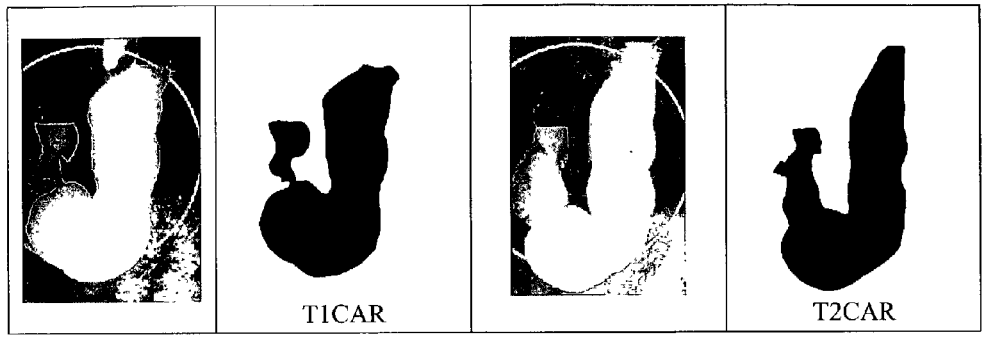
FIG. 21 shows views of another viscera, after replenishment and after model contour.

FIG. 21 shows the images before treatment and after DDCM, for the exhalation position (left side) and for the inhalation position (right side).

Validation

Figure 22:
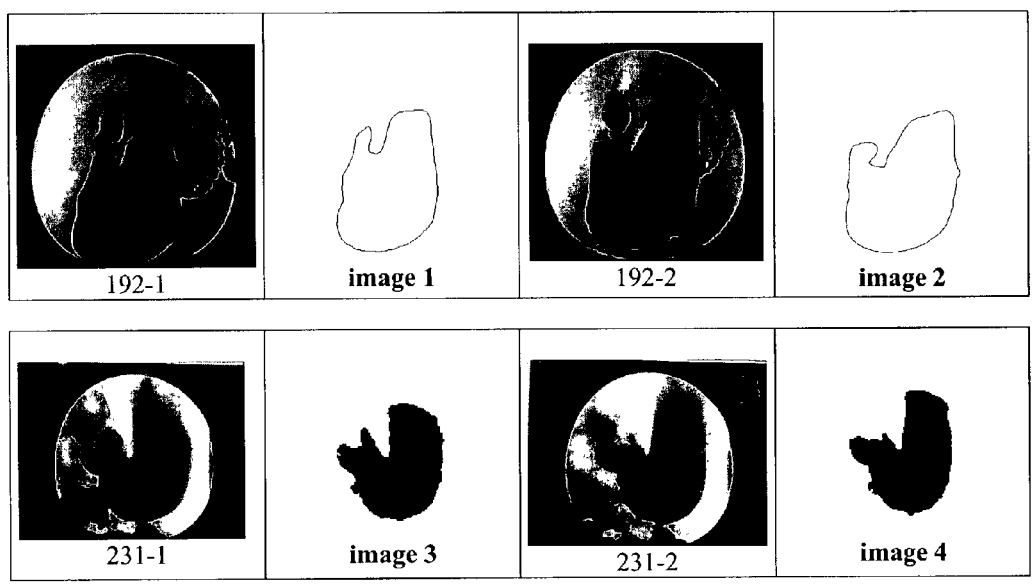
FIG. 22 shows a comparison of the results obtained by the method of the invention and the results obtained by manual treatment of the paper images.

The FIG. 22. illustrating a comparison between results found automatically by the automatic preferred method and a manual analysis (cost timing) method made by experts. Images 1,2,3 and 4 are the views after the automatic treatment of the images 192-1; 192-2, 231-1 and 231-2, images 192-1 and 231-1 being images in the exhalation position, while images 192-2 and 232-2 are images in the inhalation position.

Φ1=1–2: represents the variation in degree of the angle of the exhalation towards the inhalation between the result (image 1) of the original image 192-1 and the result (image 2) of 192-2.

Ω1: represents the variation in degree of the angle of the exhalation towards the inhalation determined manually on the original images 192-1 and 192-2.

Δ1: gives the gap in degree between Φ1 and Ω1.

Φ2, Ω2 and Δ2 are comparison parameters for images 231-1 and 231-2.

It can be seen that gaps Δ are minimal between results from the automatic analysis and those determined manually by experts. The gap Δ is included in the interval of error determined by G. Finet and Ch. Williame in their statistical study of error tests and margin of error [1]. It can therefore be concluded that the automatic analysis of the invention provided accurate results, results consuming only machine time (a few seconds), said machine time being far lower than the time (a few hours) requested for making an accurate manual analysis by experimented experts.

Results of this study have shown that an organised dynamics does exist on visceral level: viscera move on a specific way under diaphragmal pressure.

Furthermore, G. Finet and Ch. Williame noticed that this visceral course can be modified or disappears in that case, a new statistical study shows that stomach trouble (for example) corresponds to abnormal dynamics of the same organ.

In order to re-equilibrate those movements, this study permits to found new visceral normalisation; technique is simple, based on the precise knowledge of visceral dynamics discovered in the research.

Conclusions and Perspectives

The study done by G. Finet and Ch. Williame have shown that an organised and repetitive dynamics does exist on visceral level. It means that viscera move on a specific way under diaphragmal pressure. For example, stomach trouble corresponds to abnormal dynamics of the same organ, this visceral course can be modified or disappears with manual test. This permit, after manual or automatic normalisation, to control the return to normal dynamics.

Owing to our algorithms of contour detection and extraction of viscera, the treatment can be made quickly and in a brief time.

Results got by these algorithms have been tested in relation to those founded manually in this paper and in [1]. These tests prove the validity and the efficiency of the automatic treatment method to detect quickly and adequately viscera.

In the preferred method described here above, the initial images are X-ray images, X-ray provoking a loss of information at the time of the transformation in images. The method of the invention is adapted for running directly with echograms and X-ray machines, what alleviates the phase of the pre-treatment and permits by the same opportunity to treat several viscera at a time. The method is preferably completely automatic in order to facilitate the task to users and permits to note anomalies directly at the patient. A last point is to allow the software to animate the dynamics of viscera, detect anomalies and propose solutions.

In the present specification, reference is made to documents or reference, which are

[1]: G. FINET and Ch. WILLIAME, "Biométrie de la dynamique viscérale et nouvelles normalisations osteopathiques", Ed. R. JOLLOIS 1992.

[2]: M. Kass, A. Witkin "Snakes: Active contour models" Int. J. Comput. Vision, pp. 321–331, 1988.

[3]: J. V. Miller, D. E. Breen, "Extracting geometric models through constraint minimization," Rensselaer Polytechnic Institute, Tech. Rep. N 90024, 1990.

[4]: S. Lobregt and Max A. Viergever, "A Discrete Dynamic Contour Model", IEEE Transactions on Medical Imaging, Vol. 14, No. 1, March 1995. Pg. 12–24.

[5]: F. Mauro, "Detection automatique du contour ventriculaire gauche par images echographiques" T. F. E. Faculté Polytechnique de Mons, 1997. 5introduction—conclusion)

[6]: Ch. Williame and G. Finet, <<Treating visceral dysfunction>>, 2000, Ed Stillness press, LLC Portland Oreg.

The content of these references and documents are incorporated in their entirety to the present specification by reference.

The method of the invention is not restricted to physiological movements. Any object having a contour represented on an image can be subjected to the method of the invention. The movement of a viscera is only one possible movement, it is obvious that the method of the invention can be used for analysis the movement ability for an articulation, for spines, etc.

While the method of the invention is preferably fully or substantially fully automatic, it can comprise some easy and rapid manual step, such as for defining a point belonging to the object on an image, for defining a maximum border for the object, for enabling some control steps if required. When several distinct objects have to be determined, it is necessary to click for each object an element (point) belonging to the object considered.

The invention is further related to a computer program for performing the method of the invention or part of the invention. This computer program is a user-friendly, interactive, visual and modular image treatment software which runs on Windows on a PC-type computer. Such basic functions as contrast manipulation, filtering, inter-images operations as well as more complex functions like contour extraction, images superposition, reference search (and specifically bones used as reference considering their stability compared to viscera) are available. All these functions are available from unrolling menus and dialog boxes. When, the computer readable means comprises only part of the software of the method of the invention, said computer readable means comprises advantageously internet connection or other communicating means for sending and receiving data. In such a case, for example part of the method is made in an independent computer, said computer sending thereafter the results to the computer or in any other readable form to the end user. However, preferably the computer readable means containing the instruction codes (such as a CD rom) contains all the instruction codes for performing on a local computer or group of local computers the method of the invention from the capture of the images up to the determination of the amplitude of deformation.

This software can for example be developed with Visual C++ in a Microsoft environment. This software is for example multidocuments and multi-views: several images can simultaneously be loaded and displayed. The file format used is for example BMP, but preferably DICON, as it enables to avoid an enhancing step of the image.

Similar search carried out on bones articulations lead to an adapted computer program (using the method of the invention) which allows the analysis of articular kinematics using medical imaging and will allow measurements of articular mobility and restrictions of this mobility. The method of the invention is thus also valid for determining the movement of one or more bones, etc.

When making an analysis of a movement due to the respiration, the images refer advantageously to shifts occurring from exhalation to inhalation, with the patient standing upright to reproduce the conditions of everyday life.

Radiographic and echographic examinations are for example recorded on videotapes. The tapes are then visualised on the screen of the echograph equipped with a camera that allows us to capture the pictures (the first during the inhalation, the other during the exhalation). These pictures are computerised; the computer memorises the horizontal and vertical shifts and the variation of the inclination axis in each space plan.

What we claim is:

1. A computerized method for studying alterations in the location of an object from a first image of the object at a first location and a second image of the object at a second location, said images being in the form of series of lines of successive points, said method comprising the steps of:
    viewing at least said first image and said second image of the object on a screen;
    marking at least one element belonging to the object in said first image and in said second image viewed on the screen;
    computing for said first image and said second image, from said marked elements successive shapes by means of a dynamic contour model algorithm, in which the algorithm determines internal forces and external forces at different points of a shape, as well as deformation forces at different points of the shape so as to define a deformed shape, and in which said algorithm is reiterated with said deformed shape up to reaching a stabilized deformed shape, whereby the dynamic contour model algorithm develops successive shapes and is associated to computer instructions for determining a correlation between two successive shapes and for stopping the reiteration of the algorithm when said determined correlation is lower than a predetermined value; and
    computing from the deformed shapes of the object in said first and second images an amplitude of the alteration in location of said object between said first and second images.

2. The method of claim 1, which further comprising the steps of:
    defining an outer border of the object in at least one image, and
    the dynamic contour model algorithm is associated to a stopping instruction, so as to stop the action of the deformation force of the shape for which the deformation force attracts a portion of the deformed shape outside the defined outer border.

3. The method of claim 1, in which the dynamic contour model algorithm determines the internal and external attraction forces working on the shape, so as to calculate deformations of said shape and to create a deformed shape in function of the calculated deformations, and in which the step of calculating deformations and the step of creating a deformed shape are reiterated until reaching a predetermined accuracy.

4. The method of claim 1, in which the dynamic contour model algorithm calculates the deformations as at least a linear combination of said internal and external attraction forces.

5. The method of claim 1, in which the algorithm determines the internal forces from the shape, said shape being defined at least by a series of vertices and by a series of curvature vectors at said vertices, whereby the algorithm determines the internal force at a vertex of the shape so that said internal force at said vertex has a direction corresponding to the direction of the curvature vector at said vertex and becomes zero when the curvature becomes constant, and whereby the algorithm determines the external forces from at least one main characteristic of the image.

6. The method of claim 5, in which the external forces are calculated from at least the brightness of pixels.

7. The method of claim 5, in which the external force at a vertex has a radial component, and in which the algorithm determines the deformation force at a vertex from at least the radial component of the external force at said vertex.

8. The method of claim 1, in which the contour model algorithm is associated to computer instructions for checking whether each two consecutive vertices are distant from each other of a distance comprised between a minimum distance and a maximum distance and for replacing two successive vertices by a single vertex in case the distance between said two successive vertices is smaller than the minimum distance, while adding a vertex between two successive vertices in case the distance between said two vertices is larger than the maximum distance.

9. The method of claim 1, which further comprises a computing treatment step not using a dynamic contour model algorithm, for further defining a shape of the object at least in one of said first and second images.

10. The method of claim 9, in which the further computing step for further defining a contour of the object by means of an edge comprises at least the following steps:
    receiving information of the location of at least one element belonging to the object in the first image and in the second image;
    determining different points belonging to the edge of the contour of the object by means of a replenishment algorithm;
whereby the replenishment algorithm cooperates with a computing instruction for stopping a replenishment at each point for which the edge of the contour is not recognizable by the replenishment algorithm.

11. The method of claim 10, in which the contour determined by the replenishment algorithm is further treated for its smoothing.

12. The method of claim 1, said method comprising computing instructions for receiving data defining at least a first image of said object at a first location and a second image of said object at a second location.

13. The method of claim 12, which comprises computing step for enhancing the received data of the first and second images by using at least one image enhancing technique.

14. The method of claim 13, in which said image enhancing technique is selected from the group consisting of contrast increase, enhancement of image dynamics, smoothing of noise, and combinations thereof.

15. The method of claim 1, in which said first and second images are images selected from the group consisting of images from X-rays systems, images from echographs systems, images from magnetic resonance IRM, images from medical imagery equipment, images from video equipment, images from cinematic equipment.

16. The method of claim 1, which computes the amplitude of the alteration of at least one parameter selected from the group consisting of the difference between X-coordinates of the centre of gravity of said surface, the difference between Y-coordinates of the centre of gravity of said surface, the difference between the inclination of the principal axis of said surface,
    said differences being taken between said images corresponding to said different conditions of said object.

17. The method of claim 1, in which a stationary reference is taken into account in the method.

18. The method of claim 1, in which said method is performed on images in different space planes of interest.

19. The method of claim 1, in which said method is performed on images in three orthogonal planes.

20. The method of claim 1, in which said object is a viscera.

21. The method of claim 1, in which said object is selected from the group consisting of abdominal viscera and urogenital viscera.

22. The method of claim 1, in which the first image corresponds to a viscera of a patient with a maximum inhalation condition, while the second image corresponds to a viscera of a patient with a maximum exhalation condition.

23. The method of claim 1, in which several images are captured corresponding to several stages during inhalation and exhalation, in order to perform a cinematic analysis.

24. The method of claim 1, in which the method uses a bone of a patient as stationary reference.

25. The method of claim 1, for measuring articulatory restrictions of mobility of a patient.

26. The method of claim 25, in which said method comprises:
  determining on a substantially automatic manner an articulation in medical imaging, from at least two images;
  observing on a substantially automatic manner and calculating an amplitude of the articulation along an axis to determine the mobility, and
  comparing on a substantially automatic manner the mobility with a prescribed mobility to determine any restriction in the articulation.

27. The method of claim 1, in which at least two computing means are used, said computing means being provided with means for receiving and sending information therebetween, whereby a first computing means send data about a first image of the object and a second image of the object to the second computing means, while the second computing means receive data from the first computing means, compute the treatment steps for the defined contour for said first and second images according to the dynamic contour model algorithm and send data resulting of the treatment steps to the first computing means.

28. The method of claim 27, in which the second computing means calculate at least an amplitude of the alteration in location of the object between said first and second images and send at least said calculated amplitude to the first computing means.

29. A computer program stored on a computer readable medium comprising program code means for performing at least the steps of:
  computing from a marked element belonging to a object in a first image and from a marked element belonging to the object in a second image, successive shapes of the object in said first image and in said second image, whereby said computing is performed by using a dynamic contour model algorithm, in which said algorithm determines internal forces and external forces at different points of a shape, as well as deformation forces at different points of the shape so as to define a deformed shape, and in which said algorithm is reiterated with said deformed shape up to reaching a stabilized deformed shape, whereby the dynamic contour model algorithm develops successive shapes and is associated to program codes for determining a correlation between two successive shapes and for stopping the reiteration of the algorithm when said determined correlation is lower than a predetermined value; and
  computing from the deformed shapes of the object in said first and second images an amplitude of the alteration in location of said object between said first and second images.

30. A support readable by a computer means comprising program code means for performing at least the steps of:
  computing from a marked element belonging to a object in a first image and from a marked element belonging to the object in a second image, successive shapes of the object in said first image and in said second image, whereby said computing is performed by using a dynamic contour model algorithm, in which said algorithm determines internal forces and external forces at different points of a shape, as well as deformation forces at different points of the shape so as to define a deformed shape, and in which said algorithm is reiterated with said deformed shape up to reaching a stabilized deformed shape, whereby the dynamic contour model algorithm develops successive shapes and is associated to program codes for determining a correlation between two successive shapes and for stopping the reiteration of the algorithm when said determined correlation is lower than a predetermined value; and
  computing from the deformed shapes of the object in said first and second images an amplitude of the alteration in location of said object between said first and second images.

* * * * *